US010250818B2

(12) United States Patent
Lee et al.

(10) Patent No.: US 10,250,818 B2
(45) Date of Patent: Apr. 2, 2019

(54) ELECTRONIC DEVICE INCLUDING A PLURALITY OF CAMERAS AND OPERATING METHOD THEREOF

(71) Applicant: Samsung Electronics Co., Ltd., Gyeonggi-do (KR)

(72) Inventors: Wooyong Lee, Gyeonggi-do (KR);
Beomjoon Kwon, Gyeonggi-do (KR);
Daehyun Sung, Gyeonggi-do (KR);
Inho Jeong, Gyeonggi-do (KR);
Jonghoon Won, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 105 days.

(21) Appl. No.: 15/410,319

(22) Filed: Jan. 19, 2017

(65) Prior Publication Data

US 2017/0244906 A1 Aug. 24, 2017

(30) Foreign Application Priority Data

Feb. 19, 2016 (KR) .......................... 10-2016-0020014

(51) Int. Cl.
*H04N 5/262* (2006.01)
*H04N 5/225* (2006.01)
*H04N 5/232* (2006.01)
*H04N 5/265* (2006.01)
*H04N 5/268* (2006.01)

(52) U.S. Cl.
CPC ......... *H04N 5/2621* (2013.01); *H04N 5/2258* (2013.01); *H04N 5/23293* (2013.01); *H04N 5/265* (2013.01); *H04N 5/268* (2013.01)

(58) Field of Classification Search
CPC .................................................. H04N 5/2621
See application file for complete search history.

(56) References Cited

U.S. PATENT DOCUMENTS

| | | | |
|---|---|---|---|
| 5,818,541 A * | 10/1998 | Matsuura | H04N 5/45 348/565 |
| 7,116,357 B1 | 10/2006 | Oya et al. | |
| 8,477,227 B2 * | 7/2013 | Hio | H04N 5/23203 348/143 |
| 8,826,353 B2 * | 9/2014 | Takahashi | H04N 7/181 348/211.1 |
| 2006/0109385 A1 | 5/2006 | Wakako et al. | |

(Continued)

FOREIGN PATENT DOCUMENTS

KR 20110078083 7/2011
WO WO 2013/101813 7/2013

OTHER PUBLICATIONS

International Search Report dated Apr. 11, 2017 issued in counterpart application No. PCT/KR2017/000433, 12 pages.

(Continued)

*Primary Examiner* — Cynthia Segura
(74) *Attorney, Agent, or Firm* — The Farrell Law Firm, P.C.

(57) ABSTRACT

An electronic device and an operating method thereof are provided. The electronic device includes a plurality of cameras, and a processor configured to activate the plurality of cameras, receive camera images that are output from the activated cameras, display at least one of the camera images, sense a camera switch request, and display a camera image different from the displayed camera image, in response to the sensed camera switch request.

18 Claims, 23 Drawing Sheets

(56) References Cited

U.S. PATENT DOCUMENTS

| | | | |
|---|---|---|---|
| 2007/0005156 A1 | 1/2007 | Moinvaziri et al. | |
| 2007/0285533 A1* | 12/2007 | Furuya | H04N 5/772 |
| | | | 348/231.2 |
| 2008/0225171 A1* | 9/2008 | Shih | H04N 5/45 |
| | | | 348/565 |
| 2008/0239102 A1 | 10/2008 | Okada et al. | |
| 2008/0303903 A1* | 12/2008 | Bentley | G08B 13/19606 |
| | | | 348/143 |
| 2009/0115854 A1* | 5/2009 | Hio | H04N 5/23203 |
| | | | 348/207.1 |
| 2011/0076003 A1 | 3/2011 | Cho et al. | |
| 2011/0157460 A1 | 6/2011 | Kim et al. | |
| 2013/0076681 A1* | 3/2013 | Sirpal | G06F 3/1438 |
| | | | 345/173 |
| 2013/0265378 A1 | 10/2013 | Abuan et al. | |
| 2014/0362257 A1* | 12/2014 | Viljamaa | H04N 5/2251 |
| | | | 348/231.99 |
| 2015/0124125 A1* | 5/2015 | Kim | H04N 5/2628 |
| | | | 348/239 |
| 2015/0326793 A1 | 11/2015 | Makinen et al. | |
| 2015/0341568 A1 | 11/2015 | Yamashita et al. | |
| 2016/0026219 A1* | 1/2016 | Kim | H04M 1/0245 |
| | | | 345/173 |
| 2017/0013179 A1* | 1/2017 | Kang | G06F 3/04883 |

OTHER PUBLICATIONS

European Search Report dated Jan. 23, 2019 issued in counterpart application No. 17753368.4-1208, 11 pages.

* cited by examiner

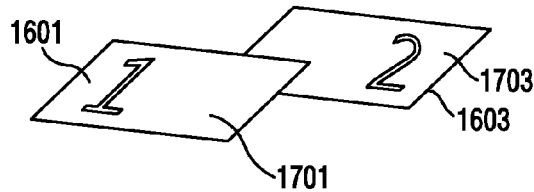 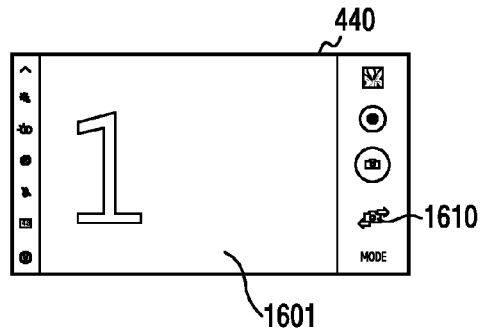
FIG.17A    FIG.17B
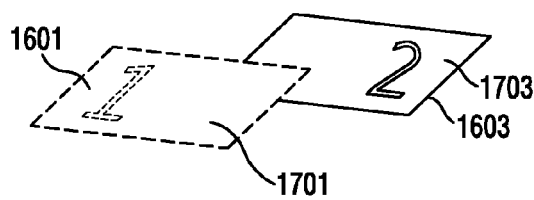 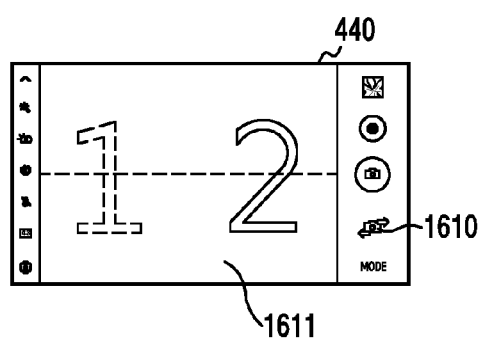
FIG.17C    FIG.17D
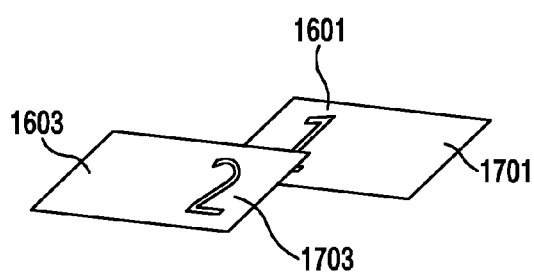 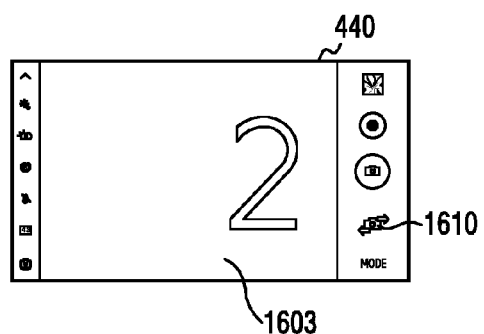
FIG.17E    FIG.17F

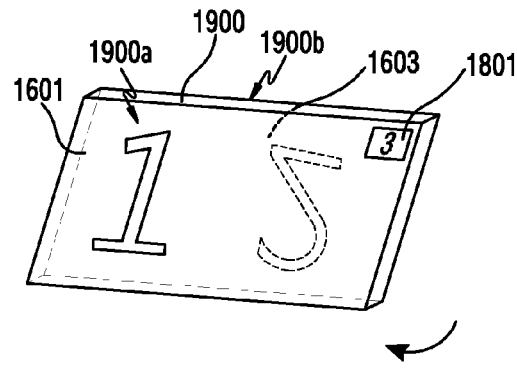 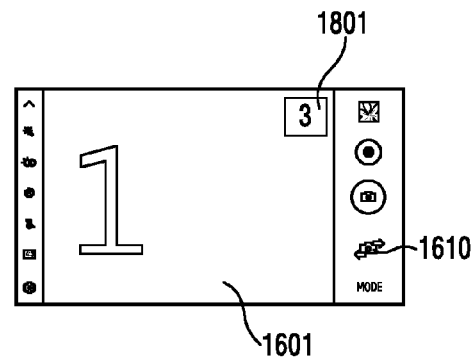
FIG.19A  FIG.19B
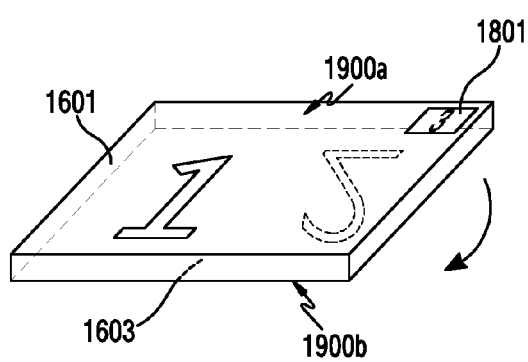 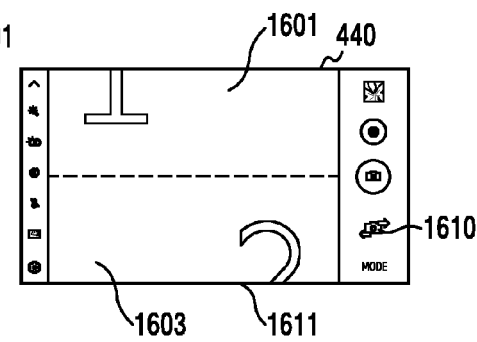
FIG.19C  FIG.19D
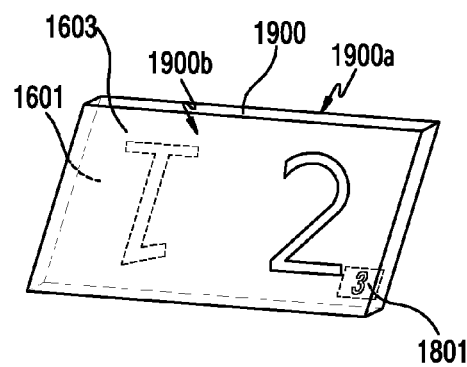 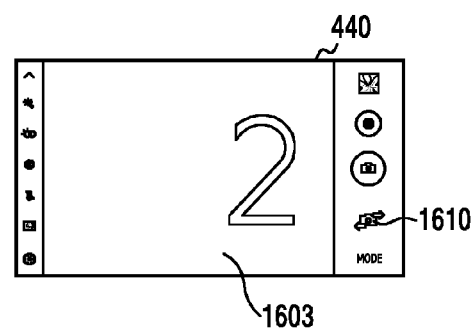
FIG.19E  FIG.19F

ELECTRONIC DEVICE INCLUDING A PLURALITY OF CAMERAS AND OPERATING METHOD THEREOF

PRIORITY

This application claims priority under 35 U.S.C. § 119(a) to Korean Patent Application Serial No. 10-2016-0020014, which was filed in the Korean Intellectual Property Office on Feb. 19, 2016, the entire content of which is incorporated herein by reference.

BACKGROUND

1. Field of the Disclosure

The present disclosure relates generally to an electronic device including a plurality of cameras, and more particularly, to an operating method of the electronic device for quickly switching between the plurality of cameras thereof.

2. Description of the Related Art

An electronic device may include a plurality of cameras. Accordingly, the electronic device may generate a camera instance, e.g., a code object, for activating a particular camera among the plurality of cameras, and use the activated camera to capture an image.

However, when a user intends to switch use from the activated camera to another camera, the electronic device may return a camera instance of the activated camera that is already in use, generate a new camera instance of the other camera that user intends to switch to, and drive the another camera. Accordingly, upon a camera switch request, it may take the electronic device a long time to generate a camera instance for a camera intended to be switched to, and then activate the intended camera.

SUMMARY

The present disclosure has been made to address the above-mentioned problems and disadvantages, and to provide at least the advantages described below.

Accordingly, an aspect of the present disclosure is to provide an electronic device that can quickly switch between a plurality of cameras therein.

In accordance with an aspect of the present disclosure, a method is provided for operating an electronic device including a plurality of cameras. The method includes activating a plurality of cameras, receiving camera images that are output from the activated cameras, displaying at least one of the camera images, sensing a camera switch request, and displaying a camera image different from the displayed camera image, in response to the camera switch request.

In accordance with another aspect of the present disclosure, an electronic device is provided. The electronic device includes a plurality of cameras, and a configured to activate the plurality of cameras, receive camera images that are output from the activated cameras, display at least one of the camera images, sense a camera switch request, and display a camera image different from the displayed camera image, in response to the sensed camera switch request.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 17A to 17F illustrate example views of a screen of an electronic device according to an embodiment of the present disclosure;

FIGS. 19A to 19F illustrate example views of a screen of an electronic device according to an embodiment of the present disclosure;

DETAILED DESCRIPTION OF THE EMBODIMENTS OF THE DISCLOSURE

Figure 1:
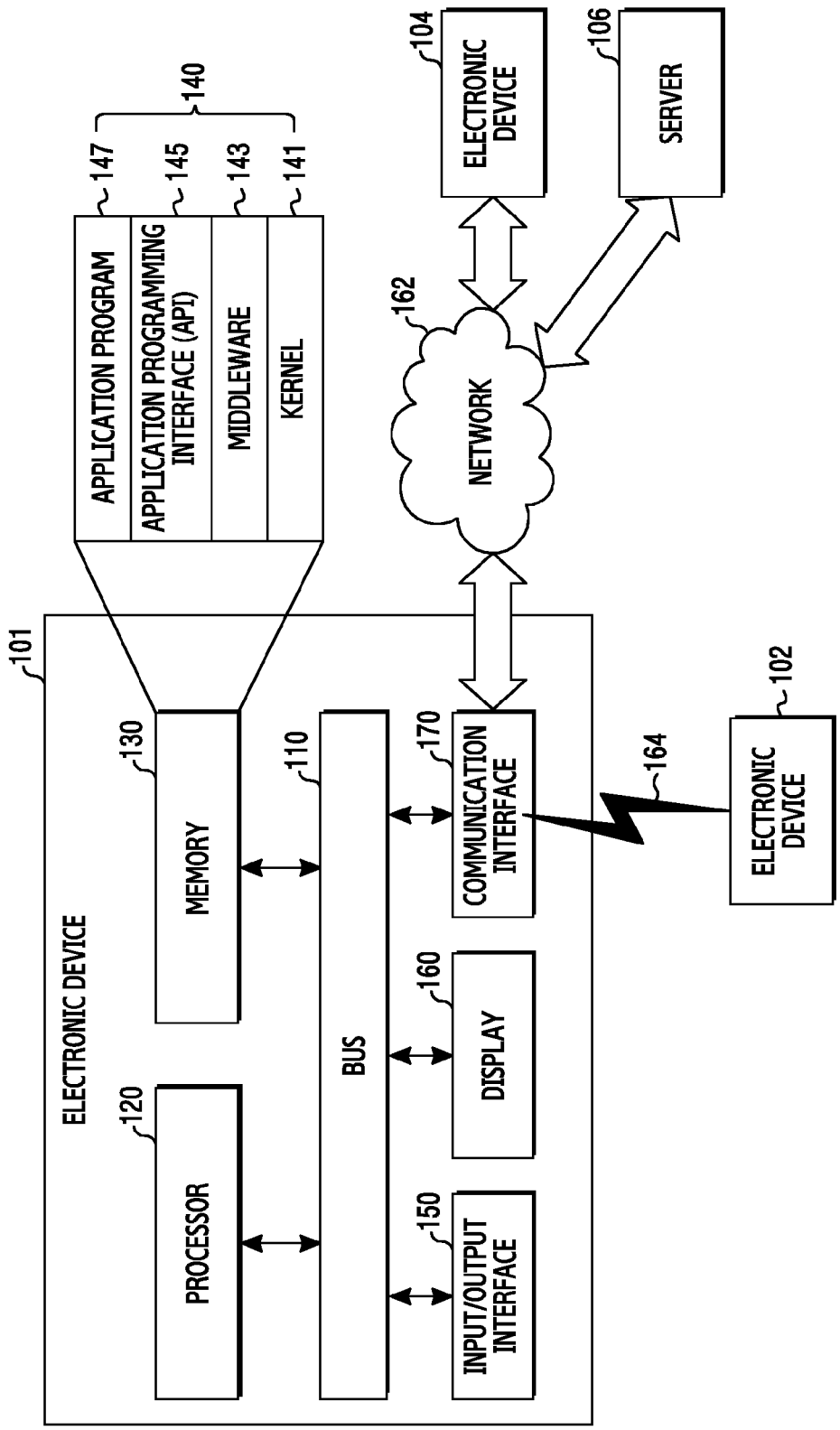
FIG. 1 illustrates a network environment system according to an embodiment of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The terms used herein to describe certain embodiments are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains. Accordingly, these terms should not be interpreted to have ideal or excessively formal meanings unless explicitly defined as such herein. Herein, the terms "have", "may have", "include", and "may include" indicate the presence of disclosed functions, features, numbers, steps, operations, elements, parts, or combinations thereof, but do not preclude the presence or addition of other functions, features, numbers, steps, operations, elements, parts, or combinations thereof.

The terms "A or B", "at least one of A or/and B" and "one or more of A or/and B" include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" may be used to modify various elements, these terms do not limit the corresponding elements. For example, these terms do not limit an order and/or importance of the corresponding elements. These terms may be used for the purpose of distinguishing one element from another element. For example, "a first user device" and "a second user device" indicate user devices and may indicate different user devices. However, a first element may be referred to as a second element, and similarly, a second element may be referred to as a first element.

When an element (e.g., a first element) is "connected to" or "(operatively or communicatively) coupled with/to" to another element (e.g., a second element), the first element may be directly connected or coupled to another element, or there may be an intervening element (e.g., a third element) therebetween. However, when the first element is "directly connected" or "directly coupled" to the second element, there is no intervening element therebetween.

The term "configured to (or set to)" may be used interchangeably with "suitable for", "having the capacity to", "designed to", "adapted to", "made to", or "capable of" according to context. Additionally, the term "configured to (set to)" does not necessarily mean "specifically designed to" in terms of hardware level. Instead, an "apparatus configured to . . . " may indicate that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

An electronic device according to an embodiment of the present disclosure may be a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., a head-mount-device (HMD), electronic glasses, electronic clothing, an electronic bracelet, an electronic necklace, an electronic appcessory, an electronic tattoo, a smart mirror, or a smart watch).

An electronic device may also be a smart home appliance, such as a television (TV), a digital video disk (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic frame.

An electronic device may also be a medical device (e.g., a mobile medical device, such as a blood glucose monitoring device, a heart rate monitor, a blood pressure monitoring device, or a temperature meter, a magnetic resonance angiography (MRA) machine, a magnetic resonance imaging (MRI) machine, a computed tomography (CT) scanner, or an ultrasound machine), a navigation device, a global positioning system (GPS) receiver, an event data recorder (EDR), a flight data recorder (FDR), an in-vehicle infotainment device, an electronic equipment for a ship (e.g., ship navigation equipment and/or a gyrocompass), an avionics equipment, a security equipment, a head unit for vehicle, an industrial or home robot, an automatic teller machine (ATM), a point of sale (POS) device at a store, or an Internet of things (IoT) device (e.g., a lightbulb, a sensor, an electronic meter, a gas meter, a sprinkler, a fire alarm, a thermostat, a streetlamp, a toaster, a sporting equipment, a hot-water tank, a heater, a boiler, etc.).

An electronic device may also include a piece of furniture or a building/structure, an electronic board, an electronic signature receiving device, a projector, and a measuring instrument (e.g., a water meter, an electricity meter, a gas meter, or a wave meter).

An electronic device may also include a combination of the above-mentioned devices.

Further, it will be apparent to those skilled in the art that an electronic device according to an embodiment of the present disclosure is not limited to the above-mentioned devices.

FIG. 1 illustrates a network environment system according to an embodiment of the present disclosure.

Referring to FIG. 1, an electronic device 101 includes a bus 110, a processor 120, a memory 130, an input/output (I/O) interface 150, a display 160, and a communication interface 170.

The bus 110 may be a circuit for connecting the processor 120, the memory 130, the I/O interface 150, the display 160 and/or the communication interface 170 with each other, and transferring communication (e.g., a control message) between the above-described elements.

The processor 120 may include a CPU, a communication processor (CP), a graphic processing unit (GPU).

The processor 120 may receive an instruction from the memory 130, the I/O interface 150, the display 160, or the communication interface 170 via the bus 110, decipher the received instruction, and execute an operation or a data process corresponding to the deciphered instruction.

The memory 130 may include any suitable type of volatile or non-volatile memory. The memory 130 may store an instruction or data received from or generated by the processor 120 or other the elements. The memory 130 includes programming modules 140, i.e., a kernel 141, a middleware 143, an application programming interface (API) 145, and an application 147. Each of the programming modules may be configured using a software, a firmware, a hardware, or a combination thereof.

The kernel 141 may control or manage system resources used for executing an operation or a function implemented in the middleware 143, the API 145, and/or the application 147. The kernel 141 may provide an interface for the middleware 143, the API 145, or the application 147 to access, control, and/or manage an individual element of the electronic device 101.

The middleware 143 may perform a mediation role so that the API 145 or the application 147 may communicate with the kernel 141. In connection with task requests received from the applications 147, the middleware 143 may perform a control (e.g., scheduling or load balancing) for a task request by assigning priority for system resource use of the electronic device 101 to at least one application 134.

The API 145 allows the application 147 to control a function provided by the kernel 141 or the middleware 143, and may include at least one interface or function (e.g., an instruction) for file control, window control, image processing, character control, etc.

The I/O interface 150 may transfer an instruction or data input from a user via an I/O unit (e.g., a sensor, a keyboard, or a touchscreen) to the processor 120, the memory 130, or the communication interface 170 via the bus 110. The I/O interface 150 may provide data regarding a touch input received via the touchscreen to the processor 120. The I/O interface 150 may output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include a liquid crystal display (LCD), a light emitting diode (LED) display, an organic light emitting diode (OLED) display, a micro electro mechanical system (MEMS) display, or an electronic paper display. The display 160 may display various types of contents (for example, text, images, videos, icons, or symbols). The display 160 may also include a touch screen for receiving a touch, gesture, proximity, or hovering input, e.g., from an electronic pen or a user's body.

The communication interface 170 may connect the electronic device 101 and an electronic device 104 and/or a server 106. The communication interface 170 may be connected to a network 162 through wireless communication or wired communication, and may communicate with an external device.

The wireless communication may use Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wired communication may use universal serial bus (USB), high definition multimedia interface (HDMI), recommended standard 232 (RS-232), or plain old telephone service (POTS).

The network 162 may include a communication network such as a computer network (e.g., a local area network (LAN) or a wide area network (WAN)), the Internet, or a telephone network.

The electronic devices 102 and 104 may be the same type of devices as that the electronic device 101 or may be different types of devices.

The server 106 may include a group of one or more servers.

All or some of the operations executed in the electronic device 101 may be carried out in the electronic device 102 or 104 and the server 106. When the electronic device 101 should perform some functions or services, automatically or by a request, the electronic device 101 request at least some functions related to the functions or services be performed by the electronic device 102, the electronic device 104, and/or the server 106, instead of performing the functions or services itself. The electronic device 102, the electronic device 104, and/or the server 106 may carry out the functions requested by the electronic device 101 or additional functions and provide results thereof to the electronic device 101. The electronic device 101 may provide the requested functions or services to another electronic device based on the received results or after additionally processing the received results. To this end, cloud computing, distributed computing, or client-server computing technology may be used.

Figure 2:
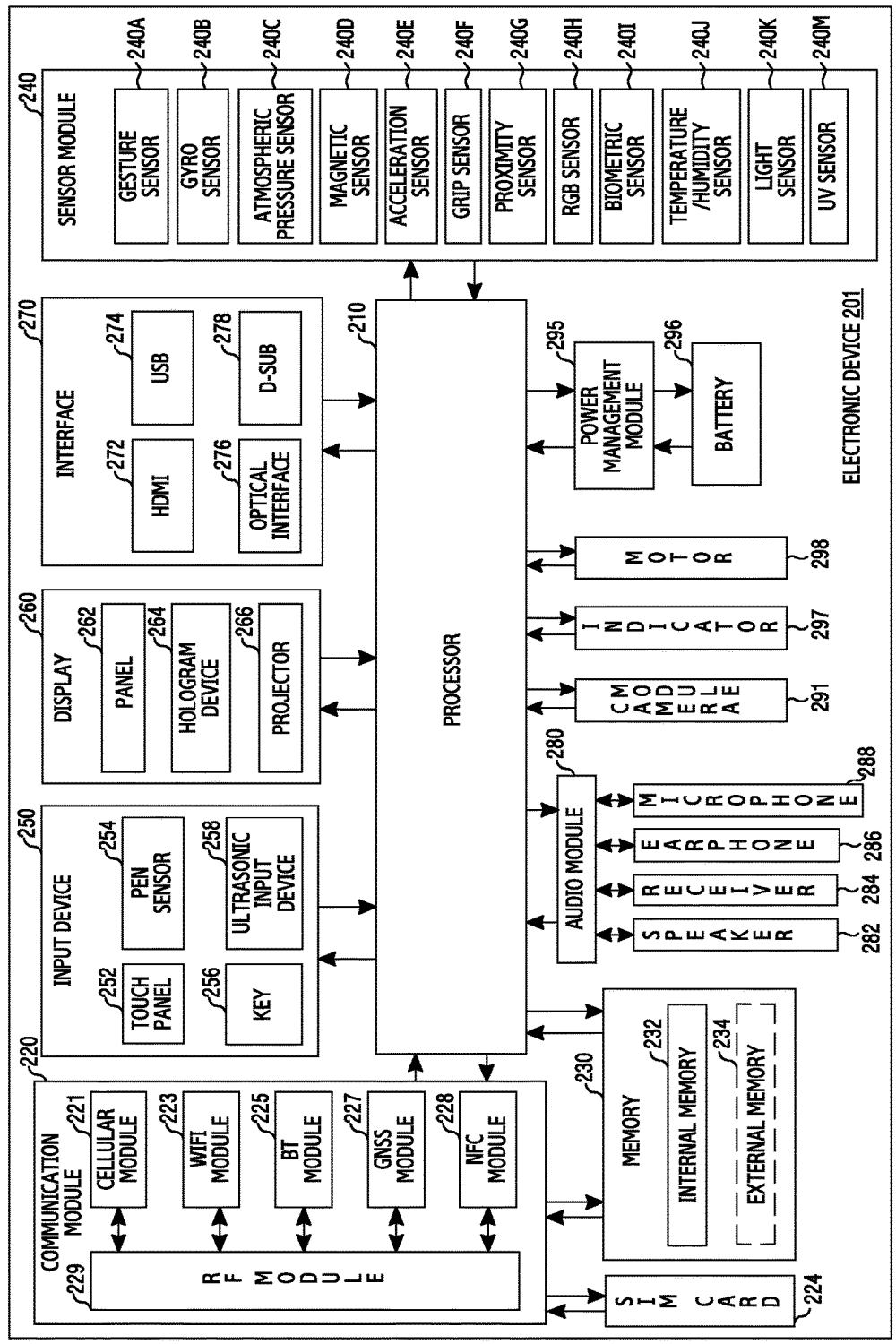
FIG. 2 illustrates an electronic device according to an embodiment of the present disclosure.

FIG. 2 illustrates an electronic device according to an embodiment of the present disclosure. The electronic device may be a part of the electronic device 101.

Referring to FIG. 2, the electronic device 201 includes a processor 210 (e.g., one or more processors), such as an AP, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive an operating system (OS) or an application to control a plurality of hardware or software elements connected to the processor 210, and perform various data processes including multimedia data and operations. The processor 210 may be implemented as a system on chip (SoC). The processor 210 may further include at least one of a GPU or image signal processor. The processor 210 may be implemented to include at least a portion of the above-described elements (e.g., a cellular module 221). The processor 210 may stores data received from at least one of other elements or generated by at least one of other elements in a non-volatile memory.

The communication module 220 may perform data transmission/reception in communication between the electronic device 201 and other electronic devices connected via a network. The communication module 220 includes a cellular module 221, a Wi-Fi module 223, a Bluetooth (BT) module 225, a GPS module 227, a near field communications (NFC) module 228, and a radio frequency (RF) module 229.

The cellular module 221 may provide voice communication, image communication, a short message service, an Internet service, etc., via a communication network (e.g., LTE, LTE-A, CDMA, WCDMA, UMTS, WiBro, GSM, etc.). The cellular module 221 may perform discrimination and authentication of an electronic device within a communication network using, e.g., using the SIM card 224. The cellular module 221 may perform at least a portion of functions that may be provided by the processor 210. The cellular module 221 may include a CP. The cellular module 221 may be implemented as a SoC.

Although elements such as the cellular module 221, the memory 230, and the power management module 295 are illustrated as elements separated from the processor 210 in FIG. 2, the processor 210 may be implemented to include at least a portion of the above-described elements.

Each of the Wi-Fi module 223, the BT module 225, the GPS module 227, and the NFC module 228 may include a processor for processing data transmitted/received via a relevant module.

Although the cellular module 221, the Wi-Fi module 223, the BT module 225, the GPS module 227, and the NFC module 228 are illustrated as separate blocks in FIG. 2, at least two of the cellular module 221, the Wi-Fi module 223, the BT module 225, the GPS module 227, and the NFC module 228 may be included in an Integrated Circuit (IC) or an IC package. For example, at least a portion of processors corresponding to each of the cellular module 221, the Wi-Fi module 223, the BT module 225, the GPS module 227, and the NFC module 228 (e.g., a communication processor corresponding to the cellular module 221 and a Wi-Fi processor corresponding to the Wi-Fi module 223) may be implemented as an SoC.

The RF module 229 may perform transmission/reception of data, e.g., transmission/reception of an RF signal. The RF module 229 may include a transceiver, a power amp module (PAM), a frequency filter, a low noise amplifier (LNA), etc. Also, the RF module 229 may include a part for transmitting/receiving an electromagnetic wave on a free space in wireless communication, e.g., a conductor or a conducting line.

Although FIG. 2 illustrates the cellular module 221, the Wi-Fi module 223, the BT module 225, the GPS module 227, and the NFC module 228 sharing the RF module 229, at least one of the cellular module 221, the Wi-Fi module 223, the BT module 225, the GPS module 227, and the NFC module 228 may perform transmission/reception of an RF signal via a separate RF module.

The SIM card 224 may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 includes an internal (or built-in) memory 232 and an external memory 234. The internal memory 232 may include at least one of a volatile memory (e.g., dynamic random access memory (DRAM), static RAM (SRAM), synchronous dynamic RAM (SDRAM)) and a non-volatile memory (e.g., one time programmable ROM (OTPROM), programmable read only memory (PROM), erasable and programmable ROM (EPROM), electrically erasable and programmable ROM (EEPROM), mask ROM, flash ROM, NAND flash memory, NOR flash memory, etc.).

The internal memory 232 may be a solid state drive (SSD).

The external memory 234 may include a flash drive, e.g., a compact flash (CF), a secure digital (SD), a micro secure digital (Micro-SD), a mini secure digital (Mini-SD), an extreme digital (xD), or a memory stick. The external memory 234 may be functionally connected with the electronic device 201 via various interfaces.

The electronic device 201 may further include a storage device (or a storage medium) such as a hard drive.

The sensor module 240 may measure a physical quantity or detect an operation state of the electronic device 201, and convert the measured or detected information to an electric signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a red, green, blue (RGB) sensor 240H, a biometric sensor 240I, a temperature/humidity sensor 240J, a light sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, a fingerprint sensor, etc. The sensor module 240 may also include a control circuit for controlling at least one sensor thereof.

The input unit 250 includes a touch panel 252, a (digital) pen sensor 254, a key 256, and an ultrasonic input unit 258. The touch panel 252 may recognize a touch input using at least one of capacitive, resistive, infrared, and ultrasonic methods. The touch panel 252 may further include a control circuit. A capacitive touch panel may perform detection by a physical contact or proximity recognition. The touch panel 252 may include a tactile layer that provides a tactile reaction to a user.

The (digital) pen sensor 254 may be implemented using a method which is the same as or similar to receiving a user's touch input, or using a separate sheet for detection.

The key 256 may include a physical button, an optical key, and/or keypad.

The ultrasonic input unit 258 recognizes data by detecting a sound wave using a microphone 288 in the electronic device 201 via an input tool generating an ultrasonic signal. The electronic device 201 may receive a user input from an external device (e.g., a computer or a server) connected to the communication module 220.

The display 260 includes a panel 262, a hologram device 264, and a projector 266. The panel 262 may be an LCD, an active-matrix organic light-emitting diode (AM-OLED), etc.

The panel 262 may be implemented such that it is flexible, transparent, and/or wearable. The panel 262 may be configured as one module together with the touch panel 252.

The hologram device 264 may show a three-dimensional image in the air using interferences of light.

The projector 266 may project light onto a screen to display an image. The screen may be positioned inside or outside of the electronic device 201.

The display 260 may also include a control circuit for controlling the panel 262, the hologram device 264, and/or the projector 266.

The interface 270 includes an HDMI 272, a USB 274, an optical interface 276, and a D-subminiature (D-sub) 278. Additionally or alternatively, the interface 270 may include a mobile high-definition link (MHL) interface, an SD card/multi-media card (MMC) interface, or an infrared data association (IrDA) standard interface.

The audio module 280 may convert a sound and an electric signal in dual directions. The audio module 280 may process sound information input or output via a speaker 282, a receiver 284, an earphone 286, the microphone 288, etc.

The camera module 291 may capture a still image and/or a moving picture. The camera module 291 includes multiple cameras and may include one or more image sensors (e.g., a front sensor or a rear sensor), a lens, an image signal processor (ISP), and/or a flash, e.g., an LED or xenon lamp.

The power management module 295 may manage power of the electronic device 201. The power management module 295 may include a power management integrated circuit (PMIC), a charging IC, and a battery gauge. The PMIC may be mounted inside an IC or an SoC semiconductor.

A charging method may be classified into a wired charging method and a wireless charging method. The charging IC may charge the battery 296 and prevent introduction of an overvoltage or an overcurrent from a charger. The charging IC may be for at least one of the wired charging method and the wireless charging method. The wireless charging method include a magnetic resonance method, a magnetic induction method, an electromagnetic wave method, etc. The charging IC may additionally include an additional circuit for wireless charging, e.g., a circuit such as a coil loop, a resonance circuit, a rectifier, etc.

The battery gauge may measure remaining power of the battery 296, a voltage, a current, and/or a temperature while charging.

The battery 296 may store or generate electricity, and supply power to the electronic device 201 using the stored or generated electricity. The battery 296 may include a rechargeable battery or a solar battery.

The indicator 297 may display a specific state of the electronic device 201 or a portion thereof (e.g., the processor 210), e.g., a booting state, a message state, a charging state, etc.

The motor 298 may convert an electric signal to mechanical vibration.

The electronic device 201 may also include a processor (e.g., a GPU) for supporting a mobile TV. The processor for supporting the mobile TV may process media data corresponding to various standards, such as digital multimedia broadcasting (DMB), digital video broadcasting (DVB), a media flow, etc.

The aforementioned elements of the electronic device according to an embodiment of the present disclosure may be constituted by one or more components, and the name of the corresponding element may vary with a type of electronic device. An electronic device according to an embodiment of the present disclosure may include at least one of the aforementioned elements. Some elements may be omitted or other additional elements may be further included in the electronic device. Further, some of the components of the electronic device may be combined to form a single entity, and thus, may equivalently execute functions of the corresponding elements prior to the combination.

Figure 3:
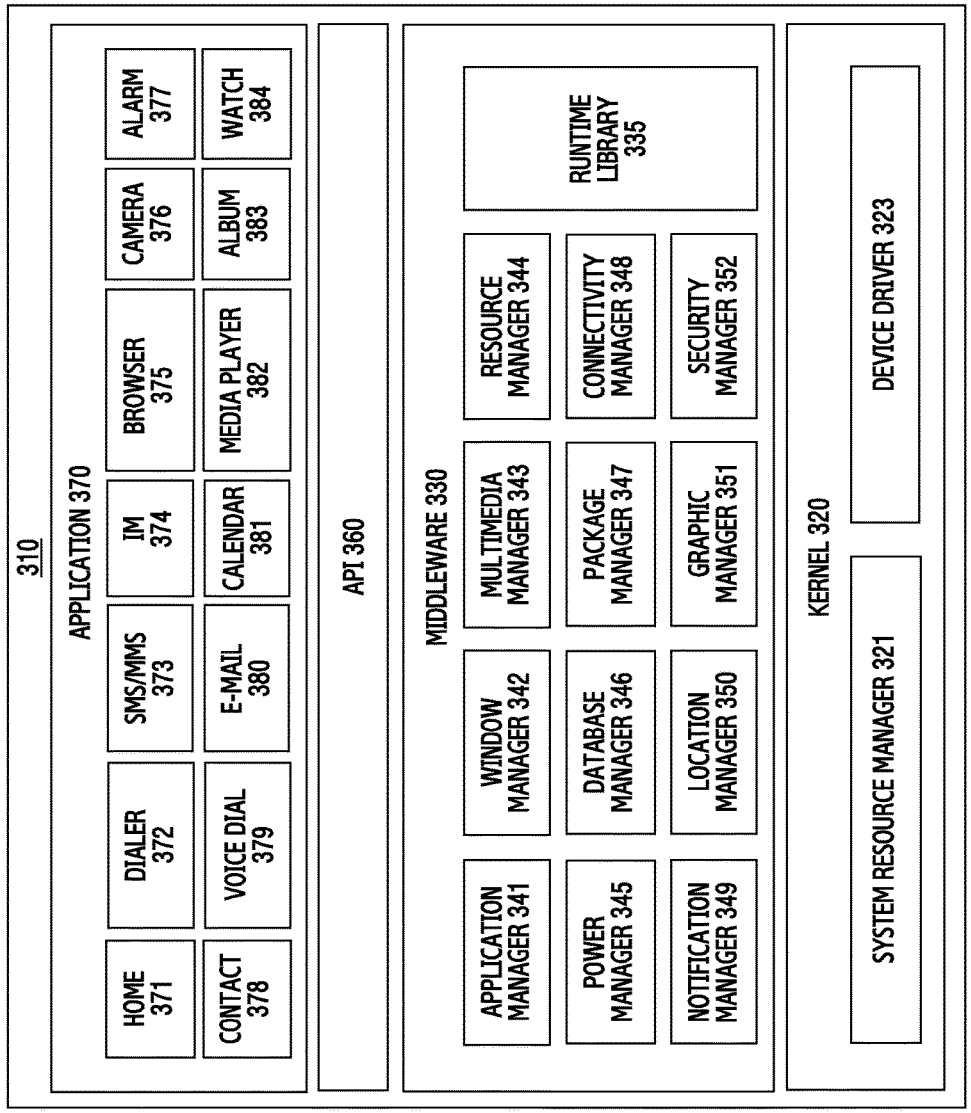
FIG. 3 illustrates a program module according to an embodiment of the present disclosure.

FIG. 3 illustrates a program module according to an embodiment of the present disclosure.

Referring to FIG. 3, the program module 310 may include an OS for controlling resources related to the electronic device and/or various applications executed in the OS. The OS may be Android™, iOS™, Windows™, Symbian™, Tizen™, Bada™, etc.

The programming module 310 includes a kernel 320, middleware 330, an API 360, and applications 370. At least some of the program module 310 may be preloaded in the electronic device or downloaded from the server.

The kernel 320 includes a system resource manager 331 and a device driver 333. The system resource manager 331 may control, allocate, or collect the system resources. The system resource manager 331 may include a process management unit, a memory management unit, or a file system management unit. The device driver 333 may include a display driver, a camera driver, a Bluetooth driver, a shared-memory driver, a USB driver, a keypad driver, a WiFi driver, an audio driver, and/or an Inter-Process Communication (IPC) driver.

The middleware 330 may provide a function required by the applications 370 in common or provide various functions to the applications 370 through the API 360 so that the applications 370 can efficiently use limited system resources within the electronic device. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add new functions through a programming language while the application 370 is executed. The runtime library 335 may perform input/output management, memory management, or a function for an arithmetic function.

The application manager 341 may manage a life cycle of at least one of the applications 370. The window manager 342 may manage Graphical User Interface (GUI) resources.

The multimedia manager 343 may manage formats for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a basic input/output system (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of Wi-Fi or Bluetooth. The notification manager 349 may display or notify of an event, such as an arrival of a message, a proximity notification, etc.

The location manager 350 may manage location information of the electronic device. The graphic manager 351 may manage graphic effects to be provided to a user and user interfaces related to the graphic effects. The security manager 352 may provide all security functions required for system security or user authentication.

When the electronic device has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of OSs in order to provide differentiated functions. Further, the middleware 330 may dynamically remove some of the existing components or add new components.

The API 360 is a set of API programming functions, and a different configuration thereof may be provided according to an OS. For example, Android or iOS may provide one API set per platform, and Tizen may provide two or more API sets per platform.

The applications 370 include a home application 371, dialer 372, a short messaging service/multimedia message service (SMS/MMS) application 373, an instant message (IM) application 374, a browser application 375, a camera application 376, an alarm application 377, a contact application 378, a voice dialer application 379, an email application 380, a calendar application 381, a media player application 382, an album application 383, and a clock (or watch) application 384. Additionally or alternatively, the applications 370 may include a health care application (e.g., an application to measure exercise or blood sugar), or an environment information application (e.g., an application to measure/provide atmospheric pressure, humidity, and/or temperature information).

The applications 370 may include an information exchange application supporting an information exchange between the electronic device and an external electronic device. The information exchange application may include a notification relay application for transferring predetermined information to an external electronic device or a device management application for managing an external electronic device.

For example, the notification relay application may include a function of transferring, to the external electronic device, notification information generated from other applications of the electronic device (e.g., the SMS/MMS application 373, the email application 380, a health management application, or an environmental information application). Further, the notification relay application may receive notification information from a control device and may provide the received notification information to the user.

The device management application may manage (e.g., install, delete, and/or update) a function for at least a part of an external electronic device communicating with the electronic device (e.g., turning on/off the external electronic device (or some elements thereof) or adjusting brightness (or resolution) of a display), applications executed in the external electronic device, or services provided from the external electronic device (e.g., a telephone call service or a message service).

The applications 370 may include an application (e.g., the health management application) designated according to attributes of the external electronic device (e.g., attributes of the electronic device such as the type of electronic device which corresponds to a mobile medical device). The applications 370 may include an application received from the external electronic devices (e.g., the server or the electronic device). The applications 370 may include a preloaded application or a third party application that can be downloaded from the server. The names of the components of the program module 310 illustrated in FIG. 3 may vary according to the type of OS.

At least some of the programming module 310 may be implemented by software, firmware, hardware, or a combination thereof. At least some of the programming module 310 may be implemented (e.g., executed) by the processor (e.g., the application program). At least some of the programming module 310 may include a module, program, routine, sets of instructions, or process for performing one or more functions.

Herein, the term "module" may refer to a unit including one of hardware, software, firmware, or a combination thereof. The term "module" may be interchangeably used with the term "unit", "logic", "logical block", "component", or "circuit". A "module" may be a minimum unit of an integrated component element or a part thereof. A "module" may be a minimum unit for performing one or more functions or a part thereof. A "module" may be mechanically or electronically implemented. For example, a module according to an embodiment of the present disclosure may include at least one of an application-specific IC (ASIC) chip, a field-programmable gate array (FPGA), and a programmable-logic device for performing operations, which are known or are to be developed hereinafter.

At least some of the devices (e.g., modules or functions thereof) or the method (e.g., operations) according to the present disclosure may be implemented by a command stored in a computer-readable storage medium in a programming module form. The instruction, when executed by a processor (e.g., a processor 470), may cause the one or more processors to execute the function corresponding to the instruction. The computer-readable storage medium may be a memory.

The computer readable recoding medium may include a hard disk, a floppy disk, magnetic media (e.g., a magnetic tape), optical media (e.g., a Compact Disc Read Only Memory (CD-ROM) and a DVD), magneto-optical media (e.g., a floptical disk), a hardware device (e.g., a ROM, a RAM, a flash memory), etc. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

A programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Figure 4:
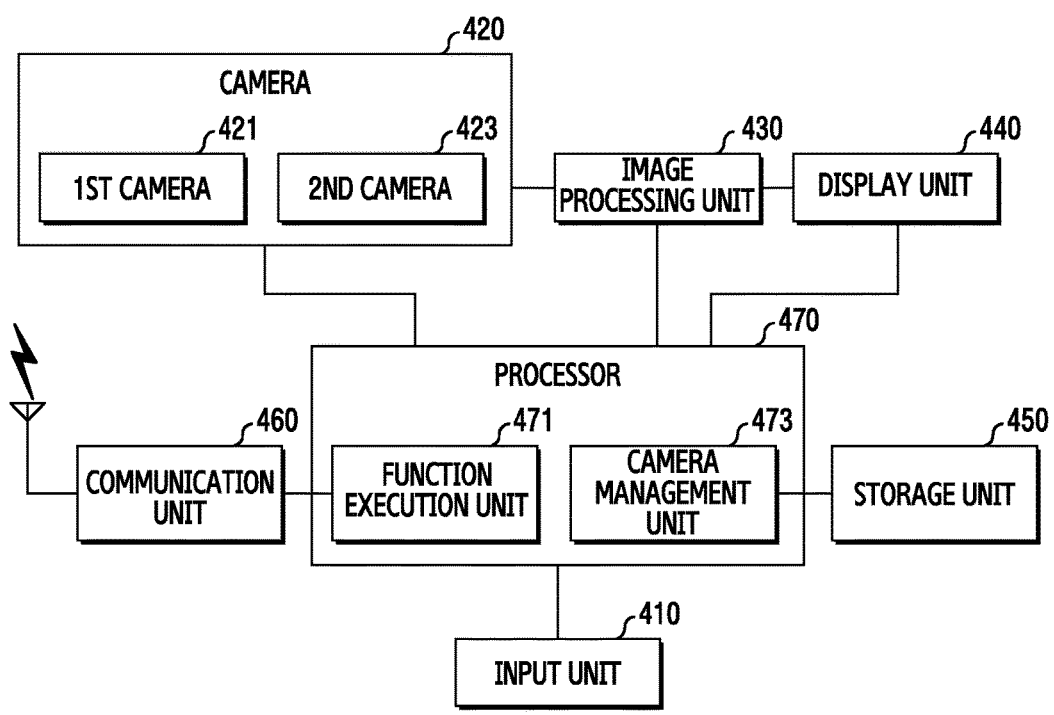
FIG. 4 illustrates an electronic device according to an embodiment of the present disclosure.

FIG. 4 illustrates an electronic device according to an embodiment of the present disclosure.

Referring to FIG. 4, the electronic device includes an input unit 410, a camera 420, an image processing unit 430, a display unit 440, a storage unit 450, a communication unit 460, and a processor 470. Alternatively, at least one of the constituent elements may be omitted from the electronic device and/or additional elements may be included therein. The electronic device may be a part of the electronic device 101 or the electronic device 102.

The input unit 410 may generate input data in the electronic device, e.g., in response to an input of a user of the electronic device. The input unit 410 may include an input device, such as a key pad, a dome switch, a physical button, a touch panel, a jog shuttle, and a sensor.

The camera 420 may generate image data. The camera 420 may include an image sensor and a signal processing unit. The image sensor may convert an optical signal into an electrical image signal. The signal processing unit may convert an analog image signal into digital image data. The image sensor and the signal processing unit may be implemented in a one-piece or a separated form. The image sensor may include a charge coupled device (CCD) sensor and a complementary metal oxide semiconductor (CMOS) sensor, and the signal processing unit may include a digital signal processor (DSP).

The camera 420 is implemented in a dual camera structure, and may acquire a plurality of images. The camera 420 includes a 1st camera 421 and a 2nd camera 423. The 1st camera 421 and the 2nd camera 423 may be arranged in mutually different surfaces of the electronic device. For example, the 1st camera 421 may be arranged in a front surface of the electronic device, and the 2nd camera 423 may be arranged in a rear surface of the electronic device. Alternatively, the 1st camera 421 and the 2nd camera 423 may be arranged in the same surface (e.g., front or rear surface) of the electronic device.

The image processing unit 430 may process image data into display data. The image processing unit 430 may include an image signal processor. The image processing unit 430 may be provided in a plural form in accordance with the number of the cameras 420. The image processing unit 430 may process the image data by the unit of frame, correspondingly to a characteristic and size of the display unit 440. The image processing unit 430 may have an image codec, and may compress the image data or decompress compressed image data. For example, the image codec may include a Joint Photographic Experts Group (JPEG) codec, a Moving Picture Experts Group 4 (MPEG4) codec, and a wavelet codec.

The display unit 440 may output display data, i.e., information that is processed in the electronic device. For example, the display unit 440 may include at least one of an LCD, an LED display, an OLED display, a MEMS display, and an electronic paper display. The display unit 440 may be combined with the input unit 410 and be implemented as a touch screen.

The storage unit 450 may store operation programs of the electronic device. The storage unit 450 may store programs for processing image data that is acquired from the camera 420. The storage unit 450 may store data that is generated while executing programs. The storage unit 450 may store an image compression file. The storage unit 450 may store image data that is acquired from the camera 420.

The communication unit 460 may perform wireless communication with an external device in various communication schemes. For example, the external device may include an electronic device, a base station, a server, or a satellite. The communication unit 460 may connect to at least one of a mobile communication network, a data communication network, and a short-range communication network. The communication scheme may include at least one of LTE, LTE-A, CDMA, WCDMA, UMTS, WiBro, GSM, WiFi, BT, NFC, global navigation satellite system (GNSS), etc.

The processor 470 may control a general operation of the electronic device. The processor 470 may be operatively coupled to the constituent elements of the electronic device, and may control the constituent elements. The processor 470 may receive a command or data from the constituent elements, and process the received command or data. The processor 470 may perform various functions. The processor 470 includes a function execution unit 471 for each function and a camera management unit 473 for controlling the camera 420. The function execution unit 471 may be an AP. The camera management unit 473 may generate, maintain, or manage a camera instance for the camera 420. More specifically, the camera management unit 473 may generate, maintain, or manage at least one of a 1st camera instance of the 1st camera 421 and a 2nd camera instance of the 2nd camera 423.

The processor 470 is operatively coupled with the 1st camera 421 and the 2nd camera 423. The processor 470 may activate the 1st camera 421 and the 2nd camera 423, receive a camera images that are output from the 1st camera 421 and the 2nd camera 423, display at least one of the camera images, sense a camera switch request, and display a camera image different from the displayed camera image.

The processor 470 may generate a camera instance, i.e., an object, for activating each of the 1st camera 421 and the 2nd camera 423.

The processor 470 can set a camera attribute for each of the 1st camera 421 and the 2nd camera 423 in accordance with the camera instance.

The processor 470 may maintain the camera instance for each of the 1st camera 421 and the 2nd camera 423 while displaying the camera images.

The processor 470 may receive all of the camera images output from the 1st camera 421 and the 2nd camera 423, and map each of the camera images to a view.

The processor 470 may sense the camera switch request, and switch the view between sensing the camera switch request and displaying the different camera image.

The processor 470 may receive the different camera image between sensing the camera switch request and displaying the different camera image.

The processor 470 may display a dummy image.

The dummy image may include at least some of the camera images output from the 1st camera 421 and the 2nd camera 423, together.

A camera image may be a preview image.

Figure 5:
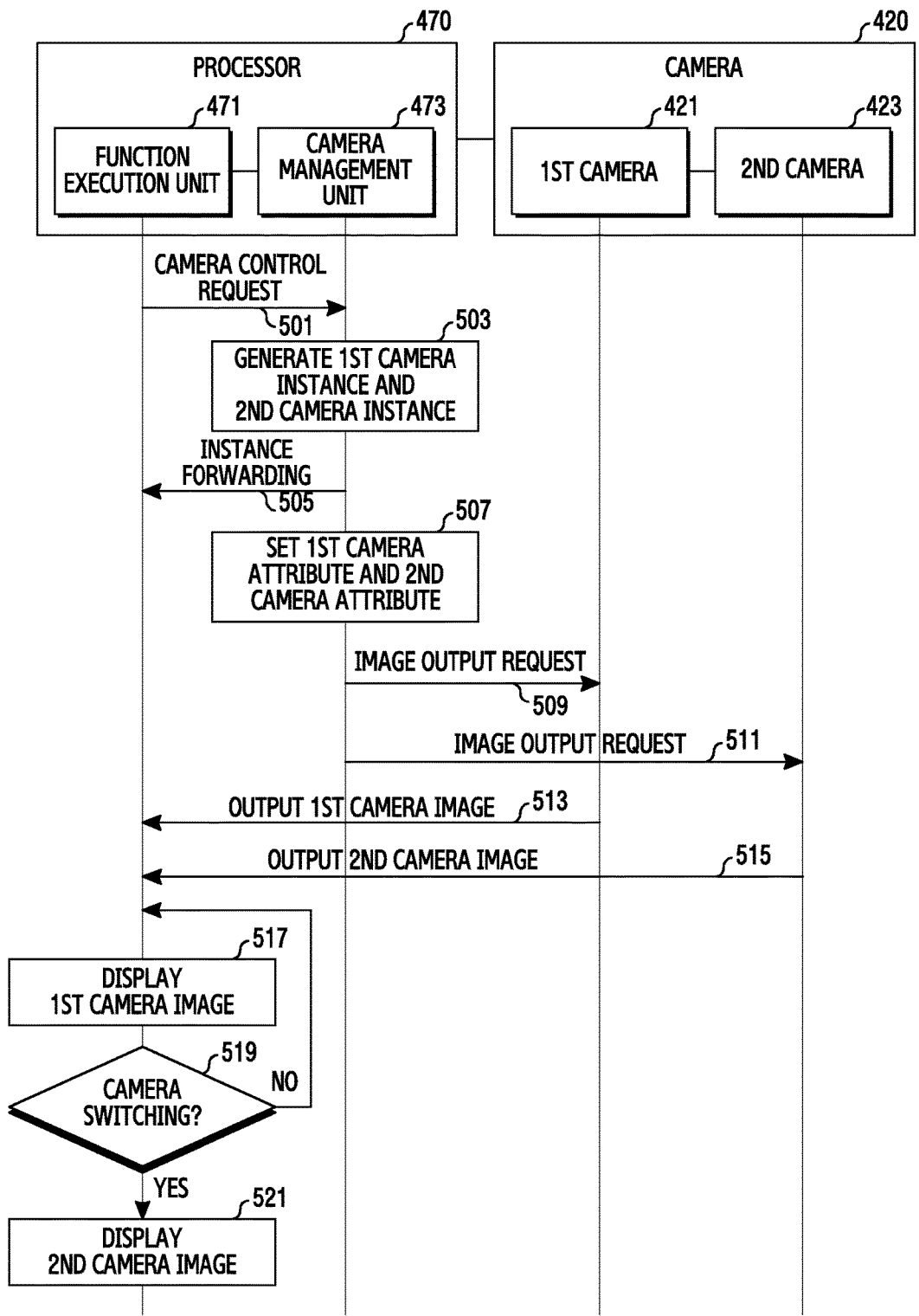
FIG. 5 is a signal flow diagram illustrating an operating method of an electronic device according to an embodiment of the present disclosure.

FIG. 5 is a signal flow diagram illustrating an operating method of an electronic device according to an embodiment of the present disclosure. For example, the operating method of FIG. 5 is illustrated as being performed by the electronic device of FIG. 4, but is not limited thereto.

Referring to FIG. 5, in step 501, the function execution unit 471 sends a camera 420 control request to the camera management unit 473, e.g., when the function execution unit 471 executes a camera application.

In step 503, the camera management unit 473 generates a camera instance, i.e., an object for activating and maintaining the camera 420. Using the camera instance, the camera management unit 473 may activate a corresponding camera, such as setting a corresponding camera attribute, outputting an image through the corresponding camera, etc. In FIG. 5, the camera management unit 473 may generate a 1st camera instance for the 1st camera 421 and a 2nd camera instance for the 2nd camera 423. That is, the camera management unit 473 may generate all of the camera instances for the electronic device. For example, even if the electronic device has three or more cameras, the camera management unit 473 may generate all of camera instances for the respective cameras.

In step 505, the camera management unit 473 forwards the generated camera instances to the function execution unit 471, in order for the function execution unit 471 to activate and maintain the camera 420.

In step 507, the camera management unit 473 sets a 1st camera attribute for the 1st camera 421 and sets a 2nd camera attribute for the 2nd camera 423. The camera management unit 473 may set the 1st camera attribute at a level for a 1st camera image to be output. The camera management unit 473 may set the 2nd camera attribute at a level for a 2nd camera image to be output. By setting the 1st and 2nd camera attributes, the 1st camera 421 and the 2nd camera 423 may prepare for image output. For example, the camera attribute may refer to a resolution, a frame rate, a preview size, a parameter, etc. The parameter may be for common camera driving, such as International Standards Organisation (ISO), auto white balance (AWB), a contrast, a brightness, automatic exposure (AE), etc.

In step 509, the camera management unit 473 sends an image output request to the 1st camera 421.

In step 511, the camera management unit 473 sends an image output request to the 2nd camera 423.

Alternatively, the camera management unit 473 may perform steps 509 and 511 at the same time.

In step 513, the 1st camera 421 outputs a 1st camera image. The 1st camera 421 may be activated according to the generated 1st camera instance, to output the 1st camera image, or the 1st camera 421 may output the 1st camera image in accordance with the 1st camera attribute setting. The 1st camera 421 may acquire image data from an image sensor, and output the 1st camera image from the acquired image data. Although the 1st camera 421 may outputs the 1st camera image to the function execution unit 471 in FIG. 5, the present disclosure is not limited thereto. For example, the 1st camera 421 may output the 1st camera image to the function execution unit 471 through the camera management unit 473.

In step 515, the 2nd camera 423 outputs a 2nd camera image. The 2nd camera 423 may be activated according to the generated 2nd camera instance, to output the 2nd camera image, or the 2nd camera 423 may output the 2nd camera image in accordance with the 2nd camera attribute setting. The 2nd camera 423 may acquire image data from an image sensor, and output the 2nd camera image based on the acquired image data. Although the 2nd camera 423 outputs the 2nd camera image to the function execution unit 471 in FIG. 5, the present disclosure is not limited thereto. For example, the 2nd camera 423 may output the 2nd camera image to the function execution unit 471 via the camera management unit 473.

In step 517, the function execution unit 471 displays the 1st camera image on the display unit 440. The function execution unit 471 may display a preview of the image that is output through the 1st camera 421. The function execution unit 471 can store or edit the image that is output through the 1st camera 421.

In step 519, the function execution unit 471 senses a camera switch request for switching from the 1st camera 421 to the 2nd camera 423. Thereafter, in step 521, the function execution unit 471 may display the 2nd camera image with the 1st camera image on the display unit 440, or the function execution unit 471 may display the 2nd camera image and stop displaying the 1st camera image. The function execution unit 471 may display a preview of the image that is output through the 2nd camera 423.

Before the function execution unit 471 displays the 2nd camera image, the function execution unit 471 may display a dummy image including at least a part of the 1st camera image and at least a part of the 2nd camera image together. From the dummy image, a user can recognize the switching from the 1st camera 421 to the 2nd camera 423. By gradually reducing a display area of the 1st camera image, the dummy image may gradually stop displaying the 1st camera image, while gradually displaying the 2nd camera image.

As described above, the operating method of FIG. 5 may display the 2nd camera image, after sensing the camera switch request, without performing a series of operations for activating the 2nd camera 421. That is, the operating method of FIG. 5 immediately displays the 2nd camera image in response to the camera switch request, because the 2nd camera instance was already generated (step 503) before sensing the camera switch request. When the camera management unit 473 receives a camera control request from the function execution unit 471 in step 501, the camera management unit 473 generates all the instances of the 1st camera 421 and the 2nd camera 423 in step 503. By doing so, the camera management unit 473 may activate the 2nd camera 423 prior to the camera switch request, thereby reducing the time for displaying the 2nd camera image, after receiving the camera switch request.

Figure 6:
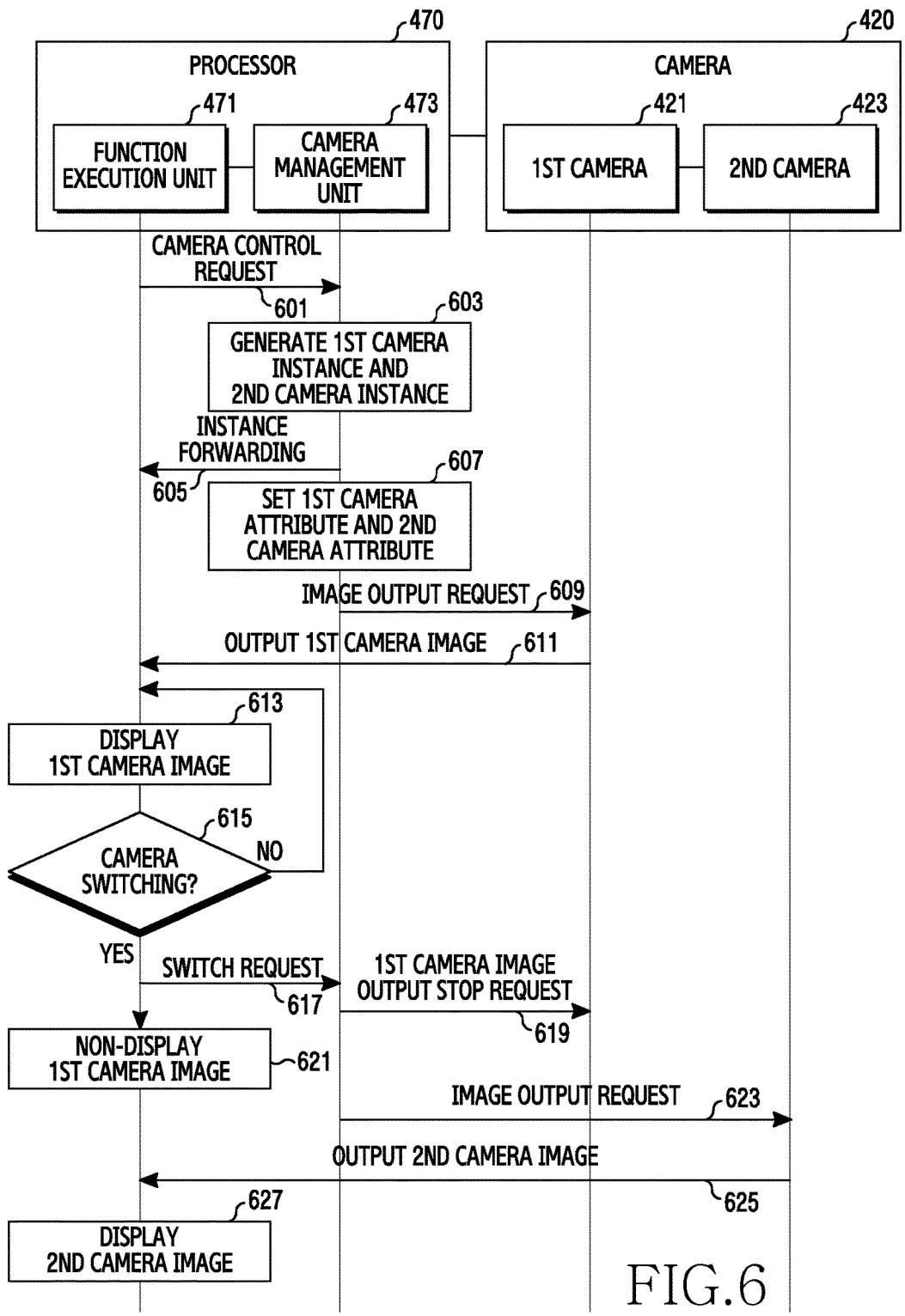
FIG. 6 is a signal flow diagram illustrating an operating method of an electronic device according to an embodiment of the present disclosure.

FIG. 6 is a signal flow diagram illustrating an operating method of an electronic device according to an embodiment of the present disclosure. For example, the operating method of FIG. 6 is illustrated as being performed by the electronic device of FIG. 4, but is not limited thereto.

Referring to FIG. 6, steps 601, 603, and 605 of FIG. 6 are equivalent to steps 501, 503, and 505 of FIG. 5. Accordingly, a repetitive description of these steps is omitted.

In step 607, the camera management unit 473 may set a 1st camera attribute and a 2nd camera attribute. The camera management unit 473 may set the 1st camera attribute at a level for a 1st camera image to output. However, the camera management unit 473 may set the 2nd camera attribute at a level, different from the level of the 1st camera attribute setting, in consideration of the environment of the electronic device. The camera management unit 473 may set the 2nd camera attribute at a level not limited to the hardware of the electronic device. For example, the camera management unit 473 may power on the 2nd camera 423, and set only a default parameter of the 2nd camera 423. The camera management unit 473 may also set the 2nd camera attribute at various levels in accordance with the environment of the electronic device. Alternatively, the camera management unit 473 may set the 2nd camera attribute at a level similar with that of the 1st camera attribute setting, e.g., as illustrated in FIG. 5.

In step 609, the camera management unit 473 sends an image output request to the 1st camera 421.

In step 611, the 1st camera 421 outputs a 1st camera image. The 1st camera 421 may acquire image data from an image sensor, and output the 1st camera image based on the acquired image data.

In step 613, the function execution unit 471 displays the 1st camera image on the display unit 440. The function execution unit 471 may display a preview of the image that is output through the 1st camera 421. The function execution unit 471 may store or edit the image that is output through the 1st camera 421.

In step 615, the function execution unit 471 senses a camera switch request for switching from the 1st camera 421 to the 2nd camera 423.

In step 617, the function execution unit 471 forwards the camera switch request to the camera management unit 473.

In step 619, the camera management unit 473 sends an image output stop request to the 1st camera 421. In accordance with the image output stop of the 1st camera 421, in step 621, the function execution unit 471 stops displaying the 1st camera image. At this time, the function execution unit 471 may capture an image of a last time point of the 1st camera image and display the captured image as a part of a dummy image, as described above.

In step 623, the camera management unit 473 sends an image output request to the 2nd camera 423. At this time, if the 2nd camera attribute has not been set at a level for the 2nd camera image to be output in step 607, the camera manage unit 473 additionally sets the 2nd camera attribute. For example, when the camera management unit 473 sets the default parameter of the 2nd camera 423 in step 607, the camera management unit 473 may additionally set the 2nd camera attribute at a level for the 2nd camera image to be output, or the camera management unit 473 may additionally set a switched parameter for the 2nd camera 423.

In step 625, the 2nd camera 423 outputs a 2nd camera image. The 2nd camera 423 may acquire image data from an image sensor, and output the 2nd camera image based on the acquired image data. The 2nd camera 423 may output the 2nd camera image to the camera management unit 473 and the function execution unit 471, or the 2nd camera 423 may output the 2nd camera image only to the function execution unit 471.

In step 627, the function execution unit 471 displays the 2nd camera image on the display unit 440. The function execution unit 471 may eliminate the earlier displayed dummy image, and display the 2nd camera image. The 2nd camera image may be a preview image.

As described above, the operating method of FIG. 6 displays the 2nd camera image, after sensing the camera switch request, without generating the 2nd camera instance for activating the 2nd camera 421, setting the 2nd camera attribute, etc. That is, because the operating method of FIG. 6 generates the 2nd camera instance and sets the 2nd camera attribute in steps 603 and 607, before the sensing of the camera switch request in step 615, the time for activating the 2nd camera 423 after sensing the camera switch request is reduced. Accordingly, because the operating method of FIG. 6 additionally sets only a switched parameter to the 2nd camera 423 and receives the 2nd camera image after receiving the camera switch request, the time required for camera switch is reduced.

Figure 7A:
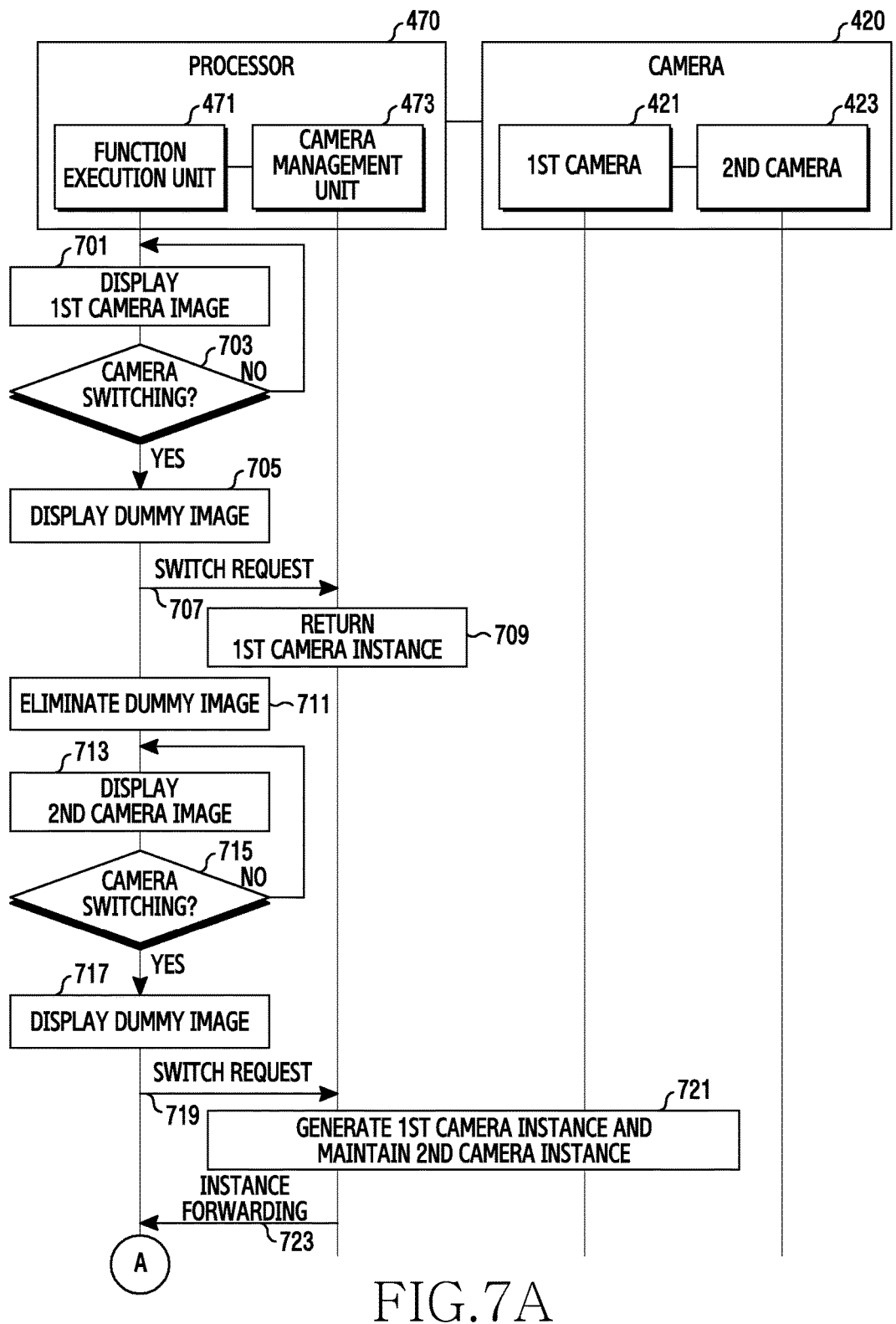
FIGS. 7A and 7B are signal flow diagrams illustrating an operating method of an electronic device according to an embodiment of the present disclosure.
Figure 7B:
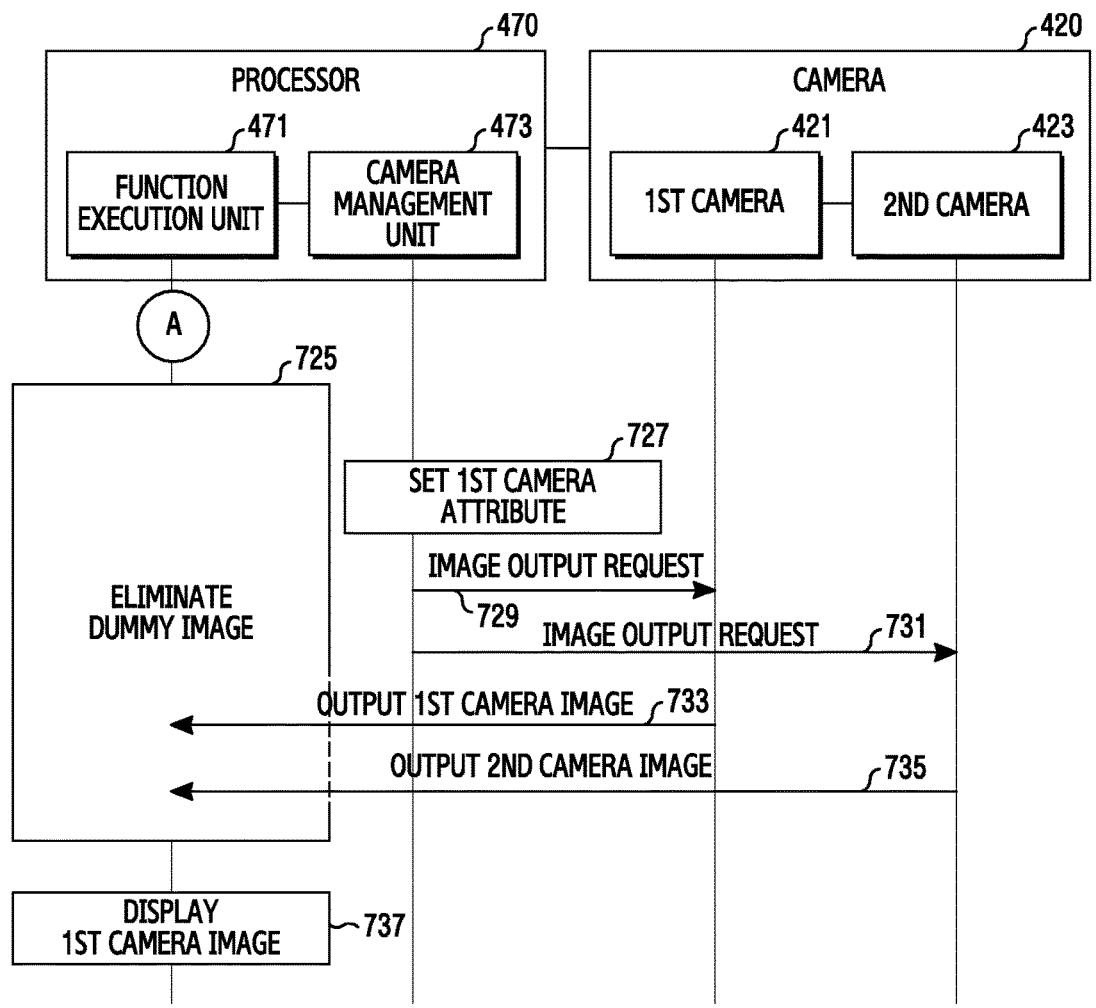

FIGS. 7A and 7B are signal flow diagrams illustrating an operating method of an electronic device according to an embodiment of the present disclosure. For example, the operating method of FIGS. 7A and 7B is illustrated as being performed by the electronic device of FIG. 4, but is not limited thereto.

Referring to FIG. 7A, step 701 is an equivalent to step 517 of FIG. 5. Also, it can be assumed that operations corresponding to steps 501 to 515 of FIG. 5 are performed before step 701. In FIGS. 7A and 7B, the 1st camera 421 may operate in a mode for generating and maintaining a plurality of camera instances. For example, the 1st camera 421 may operate in a general photographing mode having a low camera hardware limit. Accordingly, when displaying a 1st camera image in step 701, the camera management unit 473 may generate and maintain a 1st camera instance and a 2nd camera instance, as in FIG. 5. Also, the function execution unit 471 may receive the 1st camera image and a 2nd camera image, while displaying only the 1st camera image.

In step 703, the function execution unit 471 senses a camera switch request for switching from the 1st camera 421 to the 2nd camera 423. At this time, the 2nd camera 423 may operate in a mode that is incapable of generating and maintaining a plurality of camera instances. For example, the 2nd camera 423 may operate in a special photographing mode having a high camera hardware limit. When the function execution unit 471 senses the camera switch request, in step 705, the function execution unit 471 may display a dummy image on the display unit 440. As described above, the dummy image may be an image captured at a last time point of the 1st camera image.

In step 707, the function execution unit 471 sends a camera switch request to the camera management unit 473. Because the 2nd camera 423 is not currently capable of generating and maintaining a plurality of camera instances, the camera management unit 473 returns the 1st camera instance in step 709, and maintains only the 2nd camera instance.

In step 711, the function execution unit 471 eliminates (stops displaying) the dummy image, e.g., by gradually fading the dummy image out, or by gradually sliding the displayed dummy image of the screen.

After eliminating the displayed dummy image, the function execution unit 471 displays the 2nd camera image in step 713. Because the function execution unit 471 was already receiving the 2nd camera image while displaying the 1st camera image in step 701, the time required for preparing to display the 2nd camera image is short. Accordingly, the time for eliminating the dummy image may also be short.

In step 715, the function execution unit 471 senses a camera switch request for switching from the 2nd camera 423 to the 1st camera 421. As described above, the 1st camera 421 operates in a mode for generating and maintaining a plurality of camera instances.

When the function execution unit 471 senses the camera switch request, the function execution unit 471 displays a dummy image on the display unit 440 in step 717. Here, the dummy image may be a final image captured by the 2nd camera image.

In step 719, the function execution unit 471 sends the camera switch request to the camera management unit 473. Because the 1st camera 421 is generating and maintaining the plurality of camera instances, the camera management unit 473 generates a 1st camera instance, while maintaining the 2nd camera instance, in step 721.

In step 723, the camera management unit 473 forwards the 1st camera instance generated in step 721, to the function execution unit 471.

Referring to FIG. 7B, in step 725, the function execution unit 471 eliminates the dummy image.

While the function execution unit 471 is eliminating the dummy image, the camera management unit 473 sets a 1st camera attribute in accordance with the 1st camera instance in step 727, sends an image output request to the 1st camera 421 in step 729, and sends an image output request to the 2nd camera 423 in step 731.

In step 733, the 1st camera 421 outputs a 1st camera image. In step 735, the 2nd camera 423 outputs a 2nd camera image.

In step 725, the function execution unit 471 may keep eliminating the dummy image until the 1st camera image is received. That is, the function execution unit 471 may slowly eliminate the dummy image until the reception of the 1st camera image is prepared, e.g., using a gradual fade out or gradual slide. Accordingly, the time for eliminating the dummy image in step 725 may be longer than the time for eliminating the dummy image in step 711.

After eliminating the dummy image, the function execution unit 471 displays the 1st camera image in step 737.

Figure 8:
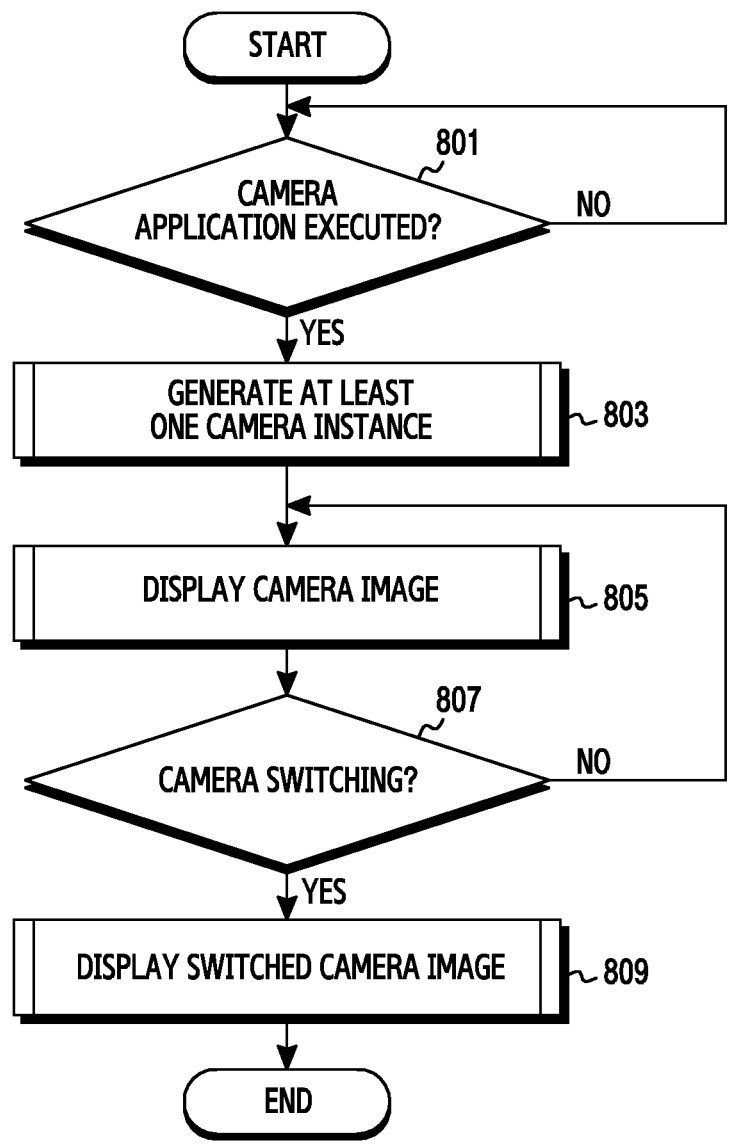
FIG. 8 is a flowchart illustrating an operating method of an electronic device according to an embodiment of the present disclosure.

FIG. 8 is a flowchart illustrating an operating method of an electronic device according to an embodiment of the present disclosure. For example, the operating method of FIG. 8 is described below as being performed by the electronic device of FIG. 4, but is not limited thereto.

Referring to FIG. 8, in step 801, the processor 470 of the electronic device senses the execution of a camera application, e.g., by receiving an input for executing the camera application through the input unit 410.

In step 803, the processor 470 generates at least one camera instance. That is, the processor 470 activates at least one of the 1st camera 421 and the 2nd camera 423.

In step 805, the processor 470 displays a camera image on the display unit 440. For example, the camera image may be a preview image.

In step 807, the processor 470 senses a camera switch request for switching a camera image that is being displayed on the display unit 440. The processor 470 may sense a request for switching to a particular camera, e.g., a request to switch from the 1st camera 421 to the 2nd camera 423.

When the processor 470 senses the camera switch request in step 807, the processor 470 displays the 2nd camera image of the switched to 2nd camera 423 on the display unit 440 in step 809.

Figure 9:
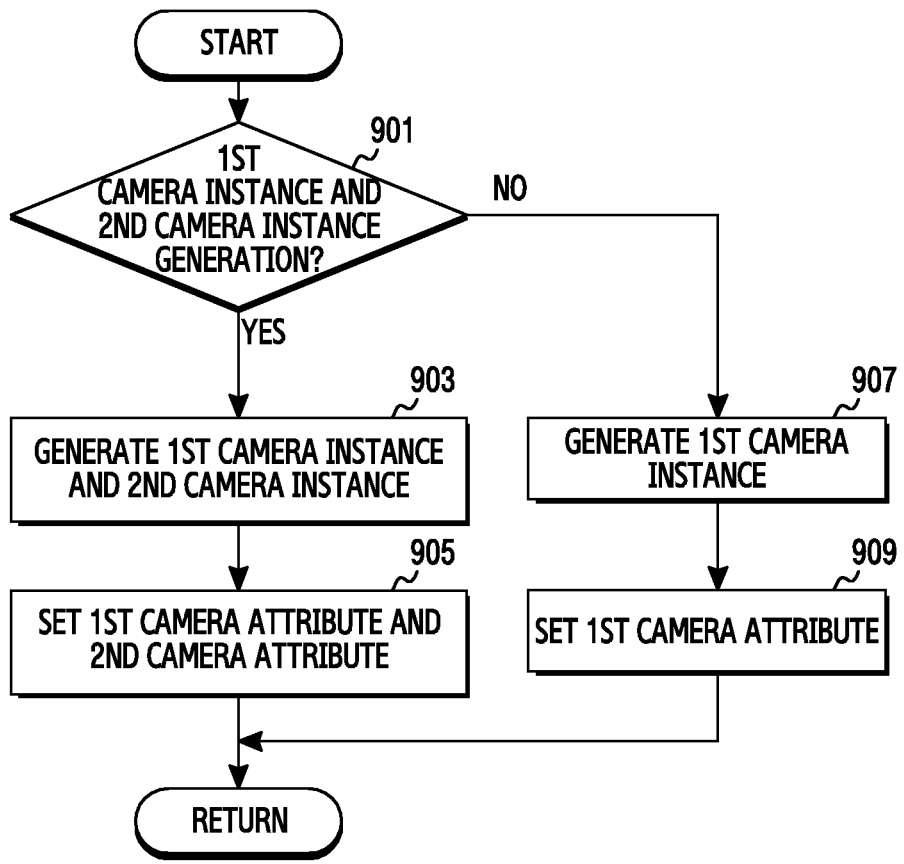
FIG. 9 is a flowchart illustrating a camera instance generation operation according to an embodiment of the present disclosure.

FIG. 9 is a flowchart illustrating a camera instance generation operation according to an embodiment of the present disclosure. For example, the camera instance generation operation of FIG. 9 may be performed in step 803 of FIG. 8. Further, the camera instance generation operation of FIG. 9 is described below as being performed by the electronic device of FIG. 4, but is not limited thereto.

Referring to FIG. 9, in step 901, the processor 470 determines whether to generate both a 1st camera instance and a 2nd camera instance. For example, the camera management unit 473 may determine whether or not to generate both of the 1st camera instance and the 2nd camera instance in accordance with a photographing mode, a limit of the image processing unit 430, a capacity of camera hardware, the type of the camera hardware, etc. When the camera application is executed in a general photographing mode, the camera management unit 473 may determine to generate both of the 1st camera instance and the 2nd camera instance in step 901.

When the camera management unit 473 determines to generate both of the 1st camera instance and the 2nd camera instance in step 901, the camera management unit 473 generates the 1st camera instance and the 2nd camera instance in step 903. The camera management unit 473 may generate the 1st camera instance and the 2nd camera instance concurrently.

In step 905, the camera management unit 473 sets a 1st camera attribute and a 2nd camera attribute. The camera management unit 473 may set the 1st camera attribute such that a 1st camera image may be output from the 1st camera 421. That is, the camera management unit 473 may prepare the 1st camera image output of the 1st camera 421. Also, the camera management unit 473 may set the 2nd camera attribute such that a 2nd camera image may be output from the 2nd camera 423. That is, the camera management unit 473 may prepare the 2nd camera image output of the 2nd camera 423. For example, the camera management unit 473 may power on and activate both of the 1st camera 421 and the 2nd camera 423. The camera management unit 473 may also set, for example, a resolution of the 1st camera 421 and 2nd camera 423, a frame rate thereof, a preview size thereof, a parameter thereof, etc.

When setting the 2nd camera attribute, the camera management unit 473 may set the 2nd camera attribute at various levels in consideration of the environment of the electronic device as well. For example, by powering on the 2nd camera 423 and setting only a default parameter of the 2nd camera 423, the camera management unit 473 may set the 2nd camera attribute at a level not limited to hardware of the electronic device.

If the processor 470 determines not to generate both of the 1st camera instance and the 2nd camera instance in step 901, the camera management unit 473 generate one of the 1st camera instance for the 1st camera or the 2nd camera instance for the 2nd camera in step 907. That is, the camera management unit 473 generates a camera instance only for a camera that is intended to be activated. For example, when the camera management unit 473 cannot generate and maintain a plurality of camera instances by the kind of camera hardware, the limit of the hardware, the limit of the image processing unit 430, a photographing mode, etc., the camera management unit 473 may generate only the 1st camera instance. Thereafter, in step 909, the camera management unit 473 sets the 1st camera attribute.

Figure 10:
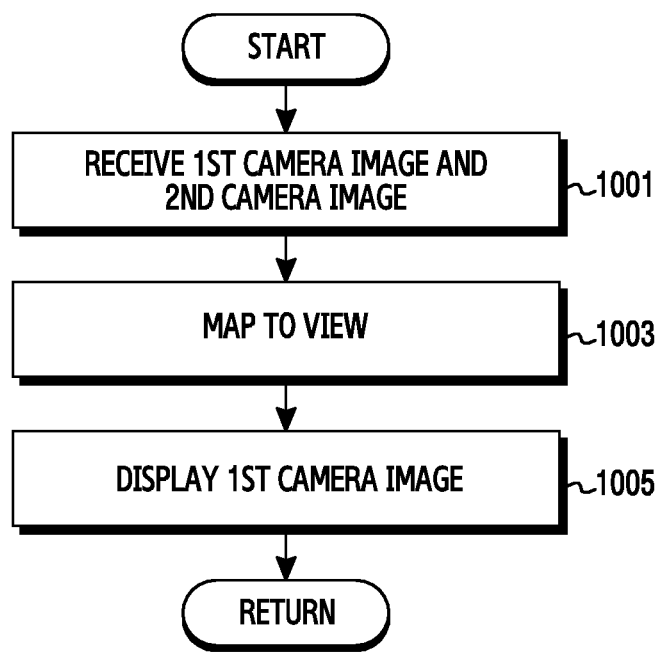
FIG. 10 is a flowchart illustrating a camera image display operation according to an embodiment of the present disclosure.

FIG. 10 is a flowchart illustrating a camera image display operation according to an embodiment of the present disclosure. For example, the camera image display operation of FIG. 10 may be performed in step 805 of FIG. 8. Further, the camera image display operation of FIG. 10 is described below as being performed by the electronic device of FIG. 4, but is not limited thereto.

Referring to FIG. 10, in step 1001, the processor 470 receives a 1st camera image and a 2nd camera image. The processor 470 may receive the 1st camera image from the 1st camera 421 that is activated according to the 1st camera instance or after setting the 1st camera attribute for the 1st camera 421. The processor 470 may receive a 2nd camera image from the 2nd camera 423 that is activated according to the 2nd camera instance, or after setting the 2nd camera attribute for the 2nd camera 423. The processor 470 may concurrently receive the 1st camera image and the 2nd camera image, or may sequentially receive the 1st camera image and the 2nd camera image.

In step 1003, the processor 470 maps each of the 1st camera image and the 2nd camera image to a view, which may be an output region for displaying a camera image on the display unit 440. The view may be used interchangeably with the terms surface, surfaceView, texture, etc. The processor 470 may map the 1st camera image and the 2nd camera image to mutually different surfaces of the view, respectively. For example, the processor 470 may map the 1st camera image and the 2nd camera image to both surfaces of the view. A preview image of each of the 1st camera image and the 2nd camera image may be mapped to the mutually different surface of the view.

In step 1005, the processor 470 displays the 1st camera image on the display unit 440. That is, the processor 470 may display the surface of the view to which the 1st camera image is mapped, on the display unit 440. Accordingly, a surface of the view to which the 2nd camera image is mapped may not be displayed on the display unit 440.

Figure 11:
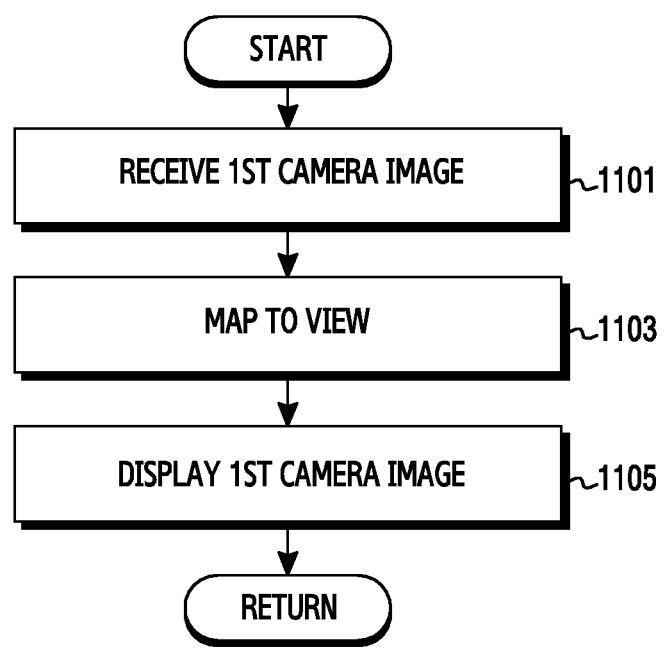
FIG. 11 is a flowchart illustrating a camera image display operation according to an embodiment of the present disclosure.

FIG. 11 is a flowchart illustrating camera image display operation according to an embodiment of the present disclosure. For example, the camera image display operation of FIG. 11 may be performed in step 805 of FIG. 8. Further, the camera image display operation of FIG. 11 is described below as being performed by the electronic device of FIG. 4, but is not limited thereto.

Referring to FIG. 11, in step 1101, the processor 470 receives a 1st camera image from the 1st camera 421, but does not receive a 2nd camera image from the 2nd camera 423. That is, the processor 470 only receives the 1st camera image from the 1st camera 421.

In step 1103, the processor 470 maps the received 1st camera image to a view. That is, because the processor 470 has not received the 2nd camera image, the 2nd camera image is not mapped to the view.

In step 1105, the processor 470 displays the 1st camera image on the display unit 440. That is, the processor 470 may display a surface of the view to which the 1st camera image is mapped, on the display unit 440.

Figure 12:
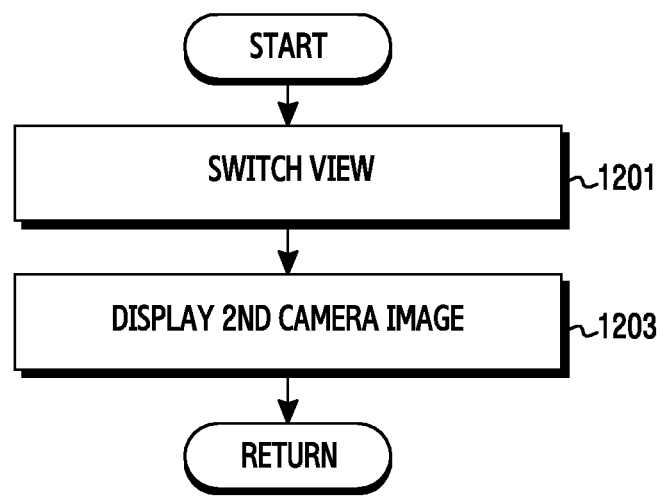
FIG. 12 is a flowchart illustrating a switched camera image display operation according to an embodiment of the present disclosure.

FIG. 12 is a flowchart illustrating a switched camera image display operation according to an embodiment of the present disclosure. For example, the switched camera image display operation of FIG. 12 may be performed in step 809 of FIG. 8. Further, the switched camera image display operation of FIG. 12 is described below as being performed by the electronic device of FIG. 4, but is not limited thereto.

Referring to FIG. 12, in step 1201, the processor 470 switches the view. That is, the processor 470 may switch the view to which the 1st camera image and the 2nd camera image are each mapped. For example, the processor 470 may rotate the view to which the 1st camera image and the 2nd camera image are each mapped. By rotating the view, the processor 470 may switch a surface of the view to which the currently displayed 1st camera image is mapped, to a surface of the view to which the 2nd camera surface is mapped. As such, the processor 470 may display the surface of the view to which the 2nd camera image is mapped, on the display unit 440. Accordingly, the surface of the view to which the 1st camera image is mapped is not be displayed on the display unit 440.

The processor 470 may display a dummy image when switching from the 1st camera image to the 2nd camera image, on the display unit 440. That is, the processor 470 can display on the display unit 440 the dummy image rotating the view to which the 1st camera image and the 2nd camera image are mutually mapped. The dummy image may be an image displaying together at least a part of the 1st camera image and at least a part of the 2nd camera image. By gradually reducing a display area of the 1st camera image, the dummy image may gradually stop displaying the 1st camera image, while gradually displaying the 2nd camera image. Using the dummy image, a user can recognize a switching from the 1st camera 421 to the 2nd camera 423. The dummy image can be displayed so quickly that it is not actually recognized by the user. Accordingly, at the camera switching, the user can recognize that an image displayed on the display unit 440 is instantly switched from the 1st camera image to the 2nd camera image.

In step 1203, the processor 470 displays the 2nd camera image.

That is, at camera application execution, both of the 1st camera 421 and the 2nd camera 423 are activated, as illustrated in FIG. 5, so that a switched camera image may be displayed without delay for activating a switched camera, after sensing the camera switch request. That is, because the electronic device receives the 2nd camera image and the 1st camera image and maps the received 2nd camera image to the view together with the 1st camera image, the electronic device may instantly display the 2nd camera image in response to the camera switch request.

In response to the camera switch request, the electronic device switches the view to which the 1st camera image and the 2nd camera image are mutually mapped. By doing so, the electronic device may instantly display the 2nd camera image. Alternatively, the electronic device may display the dummy image after displaying the 1st camera image, before displaying the 2nd camera image.

Figure 13:
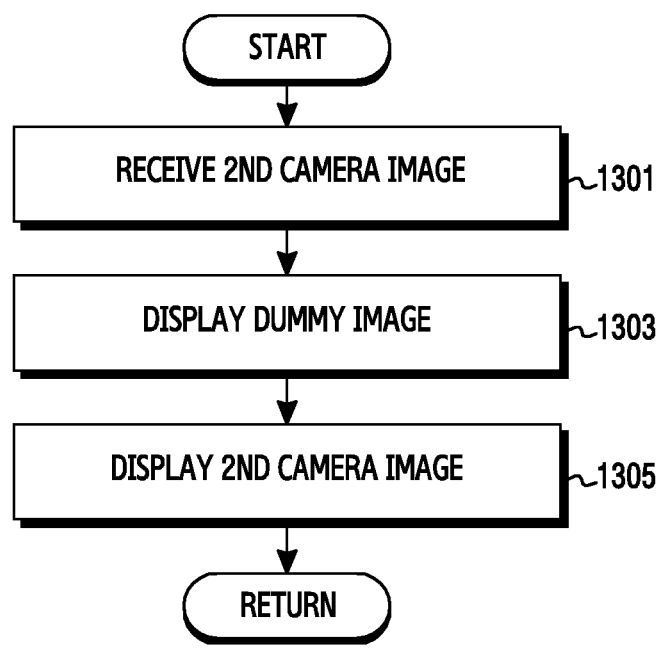
FIG. 13 is a flowchart illustrating a switched camera image display operation according to an embodiment of the present disclosure.

FIG. 13 is a flowchart illustrating a switched camera image display operation according to an embodiment of the present disclosure. For example, the switched camera image display operation of FIG. 13 may be performed in step 809 of FIG. 8. Further, the switched camera image display operation of FIG. 13 is described below as being performed by the electronic device of FIG. 4, but is not limited thereto.

Referring to FIG. 13, the processor 470 sends an image output request to the 2nd camera 423 that is a switched camera, and in step 1301, receives a 2nd camera image from the 2nd camera 423. If the 2nd camera attribute has not been set at a level that the 2nd camera image can be output, the processor 470 may additionally set the 2nd camera attribute before step 1301. For example, when the camera management unit 473 is set up only to the default parameter at the time of the 2nd camera attribute setting, the camera management unit 473 may additionally set the 2nd camera attribute at a level that the 2nd camera image may be output, or the processor 470 may additionally set a switched parameter to the 2nd camera 423.

Before displaying the 2nd camera image in step 1305, the processor 470 may display the dummy image in step 1303, for example, a last image captured from the 1st camera.

As described above, similar to FIG. 6, the electronic device may display a switched camera image after sensing the camera switch request, without delay for generating a camera instance of a switched camera. Because the 2nd camera instance is generated and the 2nd camera attribute is set at the camera application execution, i.e., before receiving the camera switch request, the electronic device may reduce the time for activating the 2nd camera 423 in response to the camera switch request. Accordingly, after receiving the camera switch request, the electronic device receives the 2nd camera image immediately from the 2nd camera 423 and displays the 2nd camera image, thereby reducing the time required for camera switch.

Figure 14A:
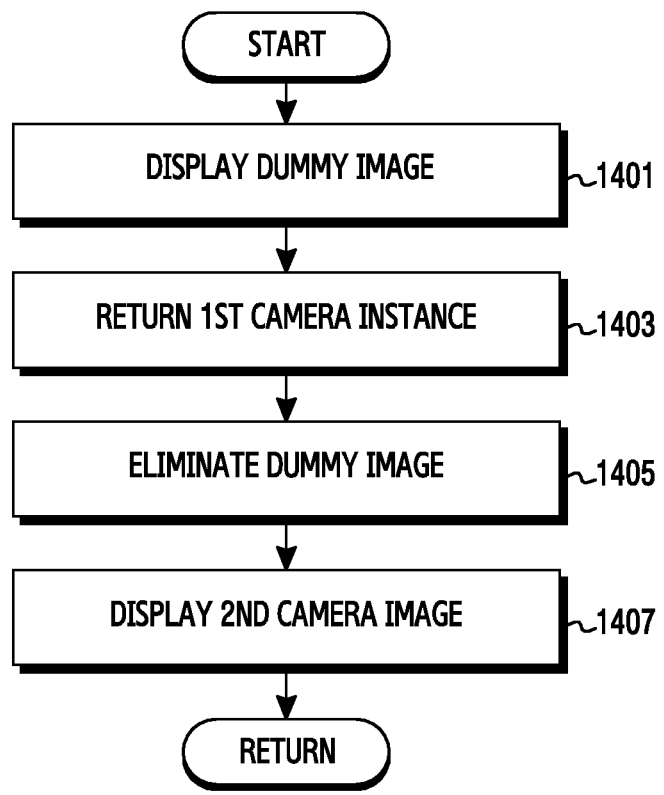
FIGS. 14A and 14B are flowcharts illustrating a switched camera image display operation according to an embodiment of the present disclosure.
Figure 14B:
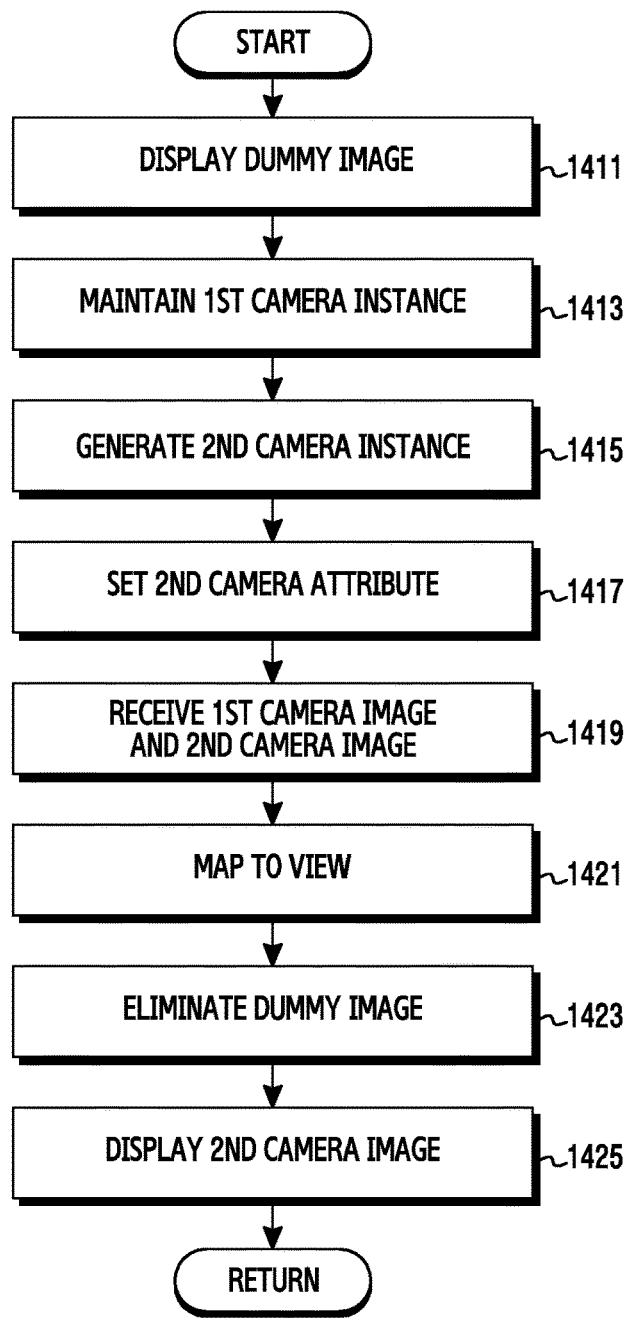

FIGS. 14A and 14B are flowcharts illustrating switched camera image display operations according to an embodiment of the present disclosure. For example, the switched camera image display operations of FIGS. 14A and 14B may be performed in step 809 of FIG. 8. Further, the switched camera image display operations of FIGS. 14A and 14B are described below as being performed by the electronic device of FIG. 4, but is not limited thereto.

Referring to FIG. 14A, in step 1401, the processor 470 displays the dummy image while the 1st camera 421 is switched to the 2nd camera 423. As described above, the dummy image may be the last image captured by the 1st camera, or various animation images.

In step 1403, the processor 470 returns the 1st camera instance. That is, when the processor 470 cannot generate and maintain a plurality of camera instances, the processor 470 may return a camera instance of a camera that is currently in use. For example, the 2nd camera 423 may operate in a special photographing mode having a large camera hardware limit. Accordingly, the processor 470 may maintain only the 2nd camera instance.

In step 1405, the processor 470 eliminates the dummy image, e.g., by gradually fading or sliding the dummy image from the display.

In step 1407, the processor 470 displays the 2nd camera image. At this time, the processor 470 can map only the received 2nd camera image to the view in consideration of the type of the display unit 440, a size thereof, etc. In step 1407, the processor 470 may display the mapped 2nd camera image on the display unit 440.

Referring to FIG. 14B, in step 1411, the processor 470 displays the dummy image.

Because the processor 470 may generate and maintain a plurality of camera instances, the processor 470 maintains the 1st camera instance in step 1413 while generating the 2nd camera instance in step 1415. That is, when the processor 470 generates only the 1st camera instance in step 907 of FIG. 9, at camera switch request, in step 1415, the processor 470 can generate the 2nd camera instance. That is, after sensing the camera switch request in step 807 of FIG. 8, the processor 470 can prepare the using of the 2nd camera 423.

In step 1417, the processor 470 sets a 2nd camera attribute in order to prepare for a 2nd camera image output.

In step 1419, the processor 470 receives the 1st camera image and the 2nd camera image, because the processor 470 maintains the 1st camera instance in step 1413.

In step 1421, the processor 470 maps the received 1st camera image and 2nd camera image to the view.

In step 1423, the processor 470 eliminates the dummy image.

Although step 1423 is illustrated as being performed subsequent to steps 1415, 1417, 1419, and 1421, the present disclosure is not limited thereto. Alternatively, steps 1415, 1417, 1419, and 1421 may be performed concurrently with step 1423.

Until the 2nd camera image is prepared for display in step 1425, the processor 470 may keep performing step 1423 as well.

In step 1425, the processor 470 displays the mapped 2nd camera image on the display unit 440.

Figure 15:
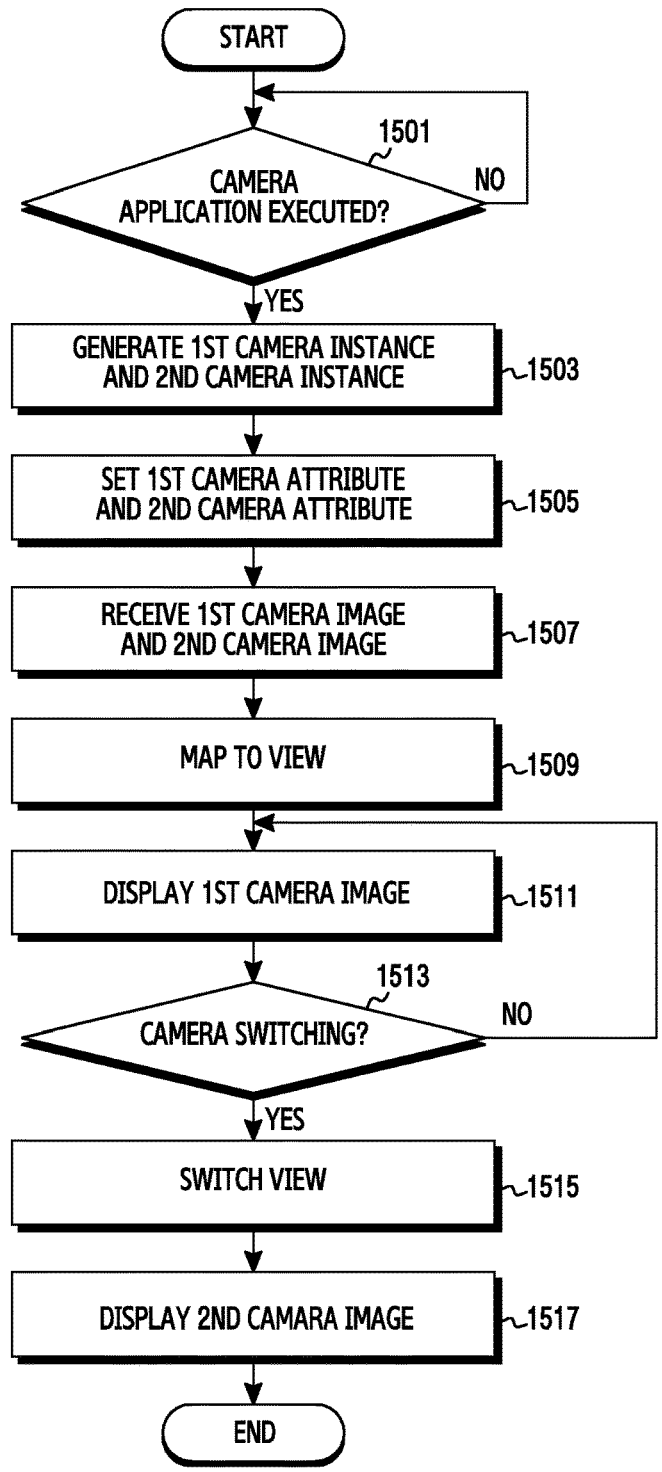
FIG. 15 is a flowchart illustrating an operating method of an electronic device according to an embodiment of the present disclosure.

FIG. 15 is a flowchart illustrating an operating method of an electronic device according to an embodiment of present disclosure.

Step 1501 of FIG. 15 is equivalent to step 801 of FIG. 8, steps 1503 and 1505 are equivalent to steps 903 and 905 of FIG. 9, and steps 1507, 1509, and 1511 are equivalent to steps 1001, 1003, and 1005 of FIG. 10. Accordingly, a repetitive description of these steps is omitted below.

FIGS. 16A to 16F illustrate example views of a screen of an electronic device according to an embodiment of the present disclosure.

Figure 16A:
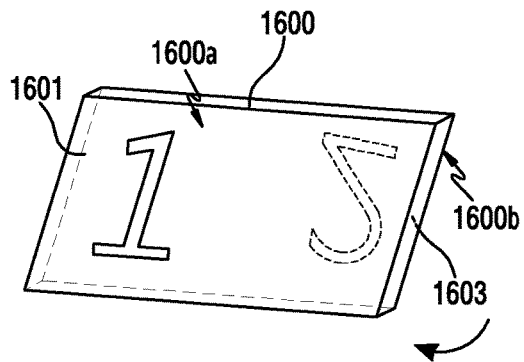
FIGS. 16A to 16F illustrate example views of a screen of an electronic device according to an embodiment of the present disclosure.

Referring to FIG. 15 and FIGS. 16A to 16F, in step 1509, the processor 470 maps each of a 1st camera image 1601 and a 2nd camera image 1603 to a view 1600. As illustrated in FIG. 16A, the processor 470 maps the 1st camera image 1601 and the 2nd camera image 1603 to different surfaces 1600a and 1600b, respectively, of the view 1600. That is, the 1st camera image 1601 is mapped to a 1st surface 1600a of the view 1600, and the 2nd camera image 1603 is mapped to a 2nd surface 1600b of the view 1600. The 1st camera image 1601 and the 2nd camera image 1603 may be preview images.

Figure 16B:
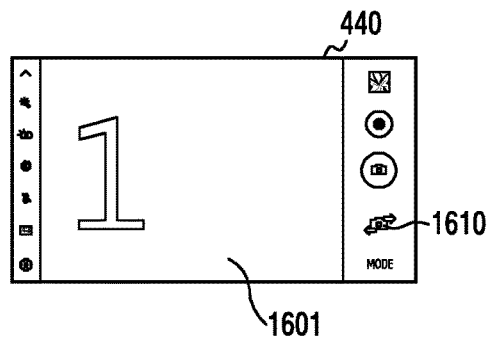

In step 1511, the processor 470 displays the 1st camera image 1601 on the display unit 440, as illustrated in FIG. 16B. That is, the processor 470 displays the 1st surface 1600a of the view 1600 to which the 1st camera image 1601 is mapped, on the display unit 440. Accordingly, the 2nd surface 1600b to which the 2nd camera image 1603 is mapped is displayed on the display unit 440.

In step 1513, the processor 470 senses a camera switch request for switching of use from the 1st camera 421 to the 2nd camera 423. As illustrated in FIG. 16B, the processor 470 may sense a selection of a camera switch icon 1610 that is displayed on the display unit 440.

Figure 16C:
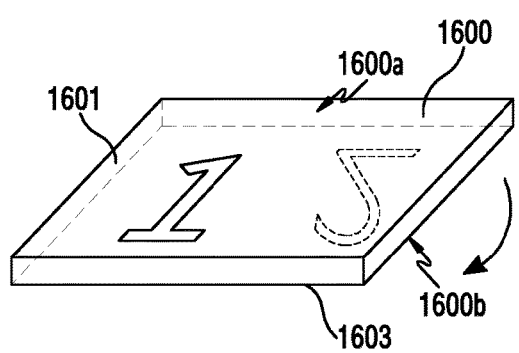
Figure 16D:
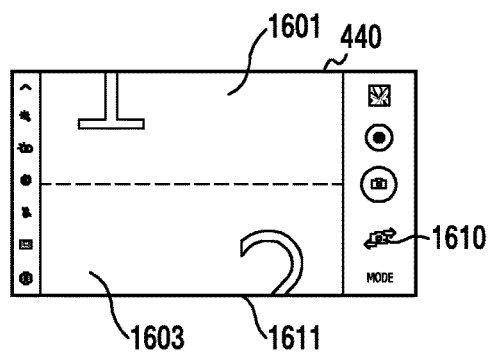

In step 1515, the processor 470 switches the view 1600. That is, as illustrated in FIG. 16C, the processor 470 switches the view 1600 by rotating the view 1600 such that the surface 1600b of the view 1600 to which the 2nd camera image 1603 is mapped is displayed on the display unit 440. As illustrated in FIG. 16D, the processor 470 displays a dummy image 1611 on the display unit 440. That is, the processor 470 displays the dummy image 1611 rotating the view 1600 to which the 1st camera image 1601 and the 2nd camera image 1603 are each mapped. This dummy image 1611 includes at least a part of the 1st camera image 1601 and at least a part of the 2nd camera image 1603. By gradually reducing a display area of the 1st camera image 1601, the dummy image 1611 can gradually stop displaying the 1st camera image 1601, while gradually displaying the 2nd camera image 1603. Using the dummy image 1611, a user can recognize the switching from the 1st camera 421 to the 2nd camera 423.

The dummy image 1611 can also be displayed so quickly that it may not be recognized by the user. Accordingly, at camera switching, the user can perceive that an image displayed on the display unit 440 is instantly switched from the 1st camera image 1601 to the 2nd camera image 1603. That is, the user may recognize that a screen displayed on the display unit 440 is switched immediately from FIG. 16B to FIG. 16F.

Figure 16E:
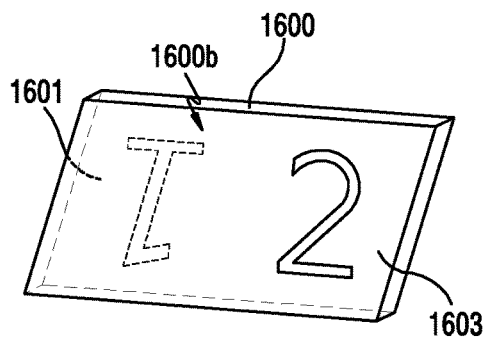
Figure 16F:
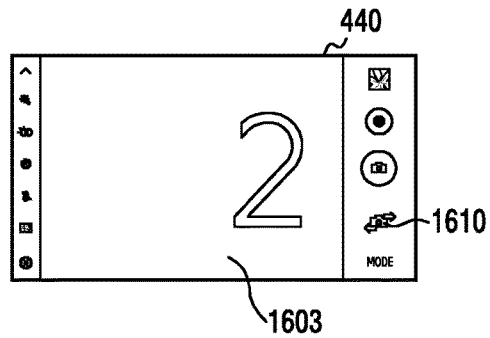

As illustrated in FIGS. 16E and 16F, after switching the view 1600, in in step 1517, the processor 470 displays the 2nd surface 1600b of the view 1600 to which the 2nd camera image 1603 is mapped. Accordingly, the 1st surface 1600a of the view 1600 to which the 1st camera image 1601 is mapped is no longer displayed on the display unit 440.

FIG. 17A to 17F illustrate example views of a screen of an electronic device according to an embodiment of the present disclosure.

Referring to FIG. 15 and FIG. 17A, in step 1509, the processor 470 maps a 1st camera image 1601 and a 2nd camera image 1603 to different views, respectively. Specifically, the 1st camera image 1601 is mapped to a 1st view 1701, and the 2nd camera image 1603 can be mapped to a 2nd view 1703. The 1st view 1701 and the 2nd view 1703 can be a structure stacked in order.

As illustrated in FIG. 17B, in step 1511, the processor 470 displays the 1st camera image 1601 on the display unit 440. That is, the processor 470 displays the 1st view 1701 to which the 1st camera image 1601 is mapped, on the display unit 440. Accordingly, the 2nd view 1703 to which the 2nd camera image 1603 is mapped is not displayed on the display unit 440.

When the processor 470 senses a camera switch request, as illustrated in FIGS. 17C and 17D the processor 470 switches to a view that is intended to be displayed on the display unit 440 in step 1515. For example, the processor 470 displays the 1st view 1701 transparently.

As illustrated in FIGS. 17E and 17F, by displaying the 1st view 1701 transparently, the processor 470 can display the 2nd view 1703 to which the 2nd camera image 1603 is mapped in step 1517, on the display unit 440. Accordingly, the 1st surface 1701 to which the 1st camera image 1601 is mapped is not be displayed on the display unit 440. In preparation for a future camera switch request, the 1st view 1701 may be positioned beneath the 2nd view 1703.

FIGS. 18A to 18F illustrate example views of a screen of an electronic device according to an embodiment of the present disclosure. Specifically, FIGS. 18A to 18F are directed the electronic device including three cameras, such that the processor 470 can receive a 1st camera image 1601, a 2nd camera image 1603, and a 3rd camera image 1801 from the respective cameras.

Figure 18A:
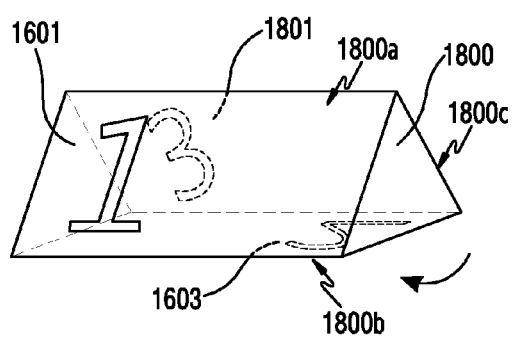
FIGS. 18A to 18F illustrate example views of a screen of an electronic device according to an embodiment of the present disclosure.

As illustrated in FIG. 15 and FIG. 18A, in step 1509, the processor 470 maps each of the 1st camera image 1601, the 2nd camera image 1603, and the 3rd camera image 1801 to a view 1800. Specifically, the processor 470 maps the 1st camera image 1601, the 2nd camera image 1603, and the 3rd camera image 1801 to a 1st surface 1800a, a 2nd surface 1800b, and a 3rd surface 1800c, respectively.

Figure 18B:
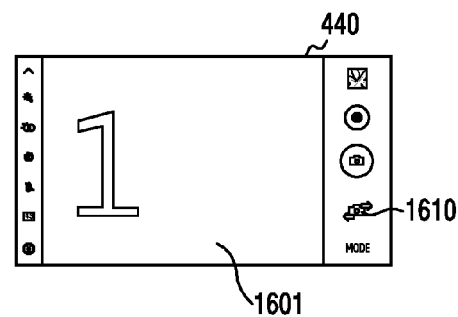

As illustrated in FIG. 18B, in step 1511, the processor 470 displays the 1st camera image 1601 on the display unit 440. That is, the processor 470 displays the 1st surface 1800a to which the 1st camera image 1601 is mapped, on the display unit 440. Accordingly, the 2nd camera image 1603 and the 3rd camera image 1801 are not displayed on the display unit 440.

Figure 18C:
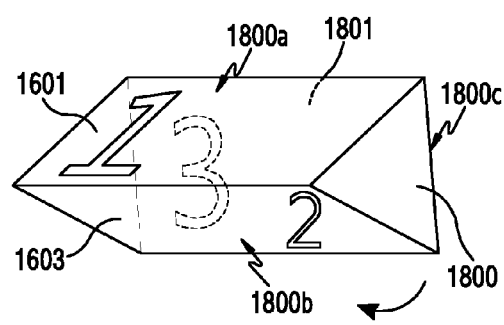
Figure 18D:
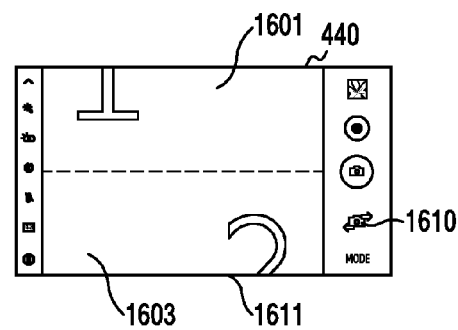

As illustrated in FIGS. 18C and 18D, when the processor 470 senses a camera switch request in step 1513, the processor 470 switches the view 1800 in step 1515. For example, the processor 470 rotates the view 1800.

Figure 18E:
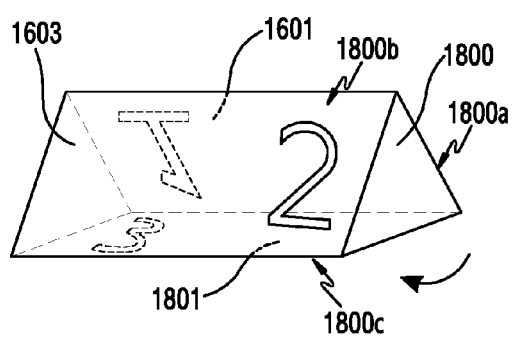
Figure 18F:
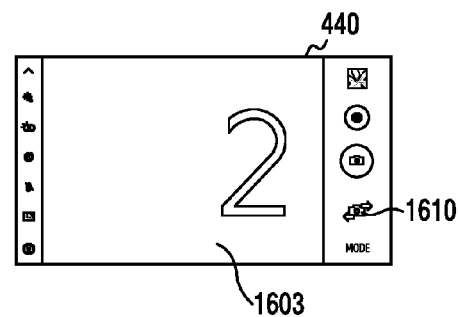

As illustrated in FIGS. 18E and 18F, after switching the view 1800, the processor 470 displays the 2nd surface 1800b to which the 2nd camera image 1603 is mapped, on the display unit 440. Accordingly, the 1st surface 1800a to which the 1st camera image 1601 is mapped and the 3rd surface 1800c to which the 3rd camera image 1801 is mapped are not displayed on the display unit 440.

Alternatively, the view 1800 may be implemented in various shapes in accordance with the number of cameras that the electronic device has. For example, the view 1800 can be of various many-sided pillars or solid figures such as a cube, a pyramid shape, a nearly cubical shape, etc. Camera images output from the plurality of cameras may be mapped to the respective surfaces of the view 1800.

FIG. 19A to 19F illustrate example views of a screen of an electronic device according to an embodiment of the present disclosure. Specifically, FIGS. 18A to 18F are directed the electronic device including three cameras, such that the processor 470 can receive a 1st camera image 1601, a 2nd camera image 1603, and a 3rd camera image 1801 from the respective cameras.

Referring to FIG. 15 and FIG. 19A, in step 1509, the processor 470 maps each of the 1st camera image 1601, the 2nd camera image 1603 and the 3rd camera image 1801 to a view 1900. Specifically, the processor 470 maps the 1st camera image 1601 and the 3rd camera image 1801 to a 1st surface 1900a of the view 1900. The processor 470 shrinks and maps the 3rd camera image 1801 to the 1st surface 1900a of the view 1900. The processor 470 maps the 2nd camera image 1603 to a 2nd surface 1900b of the view 1900.

As illustrated in FIG. 19B, in step 1511, the processor 470 displays the 1st camera image 1601 and the shrunk 3rd camera image 1801 on the display unit 440. That is, the processor 470 displays the 1st surface 1900a to which the 1st camera image 1601 and the 3rd camera image 1801 are mapped. Accordingly, the 2nd camera image 1603 is not displayed on the display unit 440.

As illustrated in FIGS. 19C and 19D, when the processor 470 senses a camera switch request in step 1513, the processor 470 switches the view 1900 in step 1515.

As illustrated in FIGS. 19E and 19F, the processor 470 displays the 2nd surface 1900b of the view 1900 to which the 2nd camera image 1603 is mapped, on the display unit 440. Accordingly, the 1st surface 1900a to which the 1st camera image 1601 and the 3rd camera image 1801 are mapped are not displayed on the display unit 440.

Figure 20:
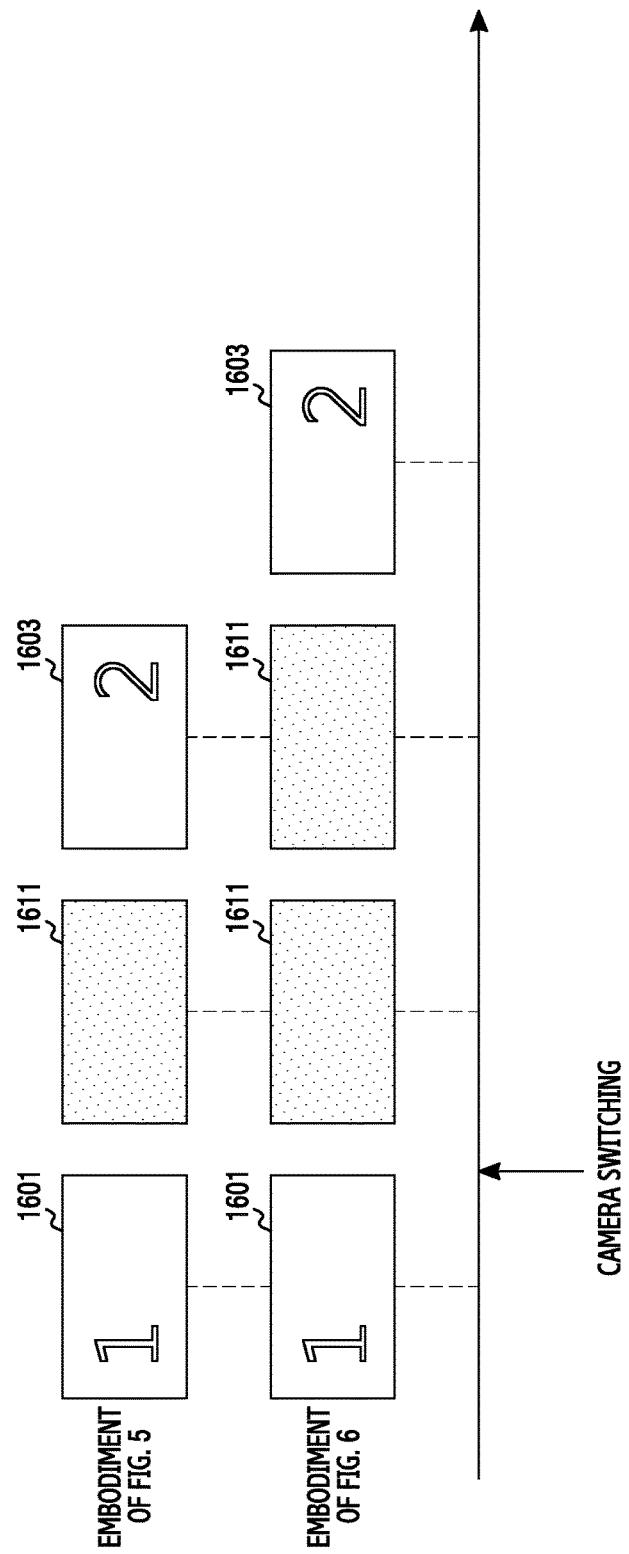
FIG. 20 is a diagram comparing the embodiment illustrated in FIG. 5 to the embodiment illustrated in FIG. 6.

FIG. 20 is a diagram comparing the embodiment illustrated in FIG. 5 to the embodiment illustrated in FIG. 6.

As described above, at a camera application execution, an electronic device according to an embodiment of the present disclosure may generate and maintain both of the 1st camera instance and the 2nd camera instance. Also, the electronic device may receive the 1st camera image 1601 and the 2nd camera image 1603 and map each of the 1st camera image 1601 and the 2nd camera image 1603 to the view. Accordingly, as illustrated in FIG. 20, at a camera switching, the electronic device may switch between the cameras quickly. Also, through the view switching, the electronic device may display the 2nd camera image 1603 quickly. That is, using the electronic device, e.g., as illustrating in FIG. 5, the time for displaying the dummy image 1611 switching from the 1st camera image 1601 to the 2nd camera image 1603 may be relatively short.

Alternatively, an electronic device according to an embodiment of the present disclosure, e.g., as illustrated in FIG. 6, may generate and maintain the 1st camera instance and the 2nd camera instance. At a camera application execution, the electronic device may first receive only the 1st camera image 1601, but prepares the 2nd camera image output through the 2nd camera attribute setting. Accordingly, as illustrated in FIG. 20, at the camera switching, the electronic device may display the dummy image 1611 during the time corresponding to the time for receiving the 2nd camera image. That is, the electronic device may display the dummy image 1611 longer, before displaying the 2nd camera image 1603, as compared to the embodiment illustrated in FIG. 5.

Figure 21:
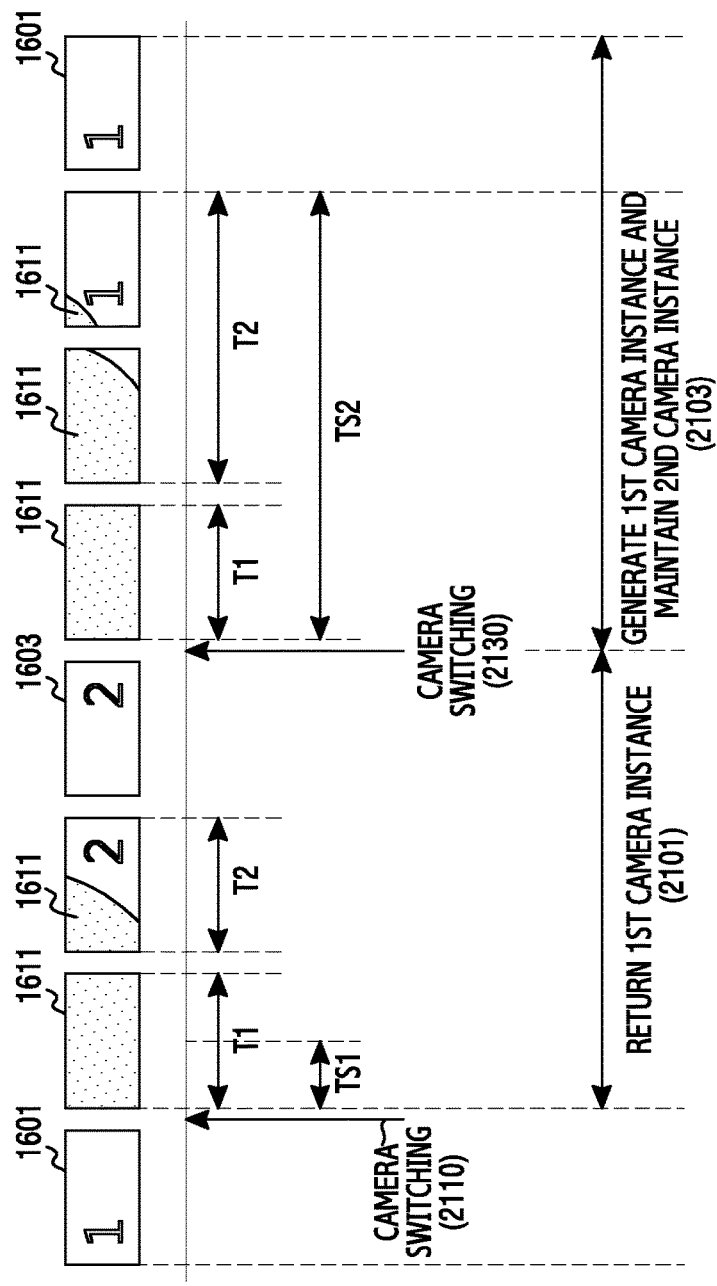
FIG. 21 illustrates an operation of an electronic device according to an embodiment of the present disclosure.

FIG. 21 illustrates an operation of an electronic device according to an embodiment of the present disclosure.

Referring to FIG. 21, camera switching can be performed between cameras having mutually different characteristics. For example, the 1st camera 421 can operate in a mode capable of generating and maintaining a plurality of camera instances. The 2nd camera 423 can operate in a mode not capable of generating and maintaining a plurality of camera instances. Accordingly, when the processor 470 displays the 1st camera image 1601, the processor 470 can generate and maintain all of the 1st camera instance and the 2nd camera instance. At a camera switching 2110 to the 2nd camera 423, the processor 470 may display the dummy image 1611. Because the 2nd camera 423 is not capable of generating and maintaining the plurality of camera instances, the processor 470 may return (2101) the 1st camera instance. While displaying the 1st camera image 1601 displaying, the 1st camera instance and the 2nd camera instance are all generated and maintained, so that the camera switching 2110 can be performed quickly. That is, the 1st time (TS1) required for actual camera switching can be shorter than the time (T1) for displaying the dummy image 1611 and the time (T2) for eliminating the dummy image 1611. The processor 470 may eliminate the dummy image 1611, and display the 2nd camera image 1603.

At a subsequent camera switching 2130 back to the 1st camera 421, the processor 470 may display the dummy image 1611. At this time, the processor 470 may generate a 1st camera instance while maintaining the 2nd camera instance, as denoted by reference numeral 2103. The time (T1) for displaying the dummy image 1611 can be equivalent to the time (T1) for displaying the dummy image 1611 at prior camera switching 2110. The processor 470 may eliminate the dummy image 1611. The time (T2) for eliminating the dummy image 1611 may be adjusted. That is, at a camera switching 2130 back to the 1st camera 421, time may be needed for generating the 1st camera instance, setting a 1st camera attribute, receiving a 1st camera image, etc. Accordingly, the processor 470 may eliminate the dummy image 1611 during the time for preparing the 1st camera 421, and adjust the time (T2) for eliminating the dummy image 1611 to be longer. That is, the processor 470 may display the dummy image 1611 and slowly eliminate the dummy image 1611, during the 2nd time (TS2) required for the actual camera switching.

Although camera switching occurs between cameras having different characteristics, a similar user environment can be provided by making identical the time (T1) for displaying the dummy image 1611 (or/and the time (T2) for eliminating the dummy image 1611).

A method for operating in an electronic device can include the operations of activating a plurality of cameras, receiving at least one of camera images that are outputted from the plurality of cameras, displaying at least any one of the camera images, sensing a camera switch request, and displaying a camera image different from the displayed camera image.

The operation of activating the plurality of cameras can further include the operation of generating a camera instance that is an object for activating a camera, for each of the plurality of cameras.

The operation of activating the plurality of cameras can further include the operation of setting a camera attribute for each of the plurality of cameras in accordance with the camera instance.

The operation of displaying the at least any one of the camera images can maintain the camera instance for each of the plurality of cameras.

The operating method of the electronic device can further include the operation of receiving all of the camera images outputted from the plurality of cameras, and mapping each of the camera images to a view.

The operating method of the electronic device can further include the operation of switching the view, between the operation of sensing the camera switch request and the operation of displaying the different camera image.

The operating method of the electronic device can further include the operation of receiving the different camera image, between the operation of sensing the camera switch request and the operation of displaying the different camera image.

The operation of sensing the camera switch request can further include the operation of displaying a dummy image switching the view.

The dummy image can display at least some of the respective camera images outputted from the plurality of cameras, together.

In the operating method of the electronic device, the camera image can be a preview image.

According to the above-described embodiments, a processor for maintaining, generating, and managing camera instances for a plurality of cameras can provide quick switching between the cameras. At a camera application execution, by activating the plurality of cameras, the processor can provide quick switching between the cameras in response to a later camera switch request. By mapping each of camera images received from the plurality of cameras to a view, the processor can provide a smooth switching emotion in accordance with the switching of the view in response to the camera switch request.

According to the various embodiments described above, a quick camera switch speed can be provided even if camera switching occurs between cameras having various characteristics. Accordingly, the embodiments of the present disclosure can provide a similar user environment, even if camera switching occurs between cameras having mutually different characteristics.

While the present disclosure has been shown and described with reference to certain embodiments thereof, it will be apparent to those skilled in the art that the present disclosure is not limited to these embodiments, and various changes in form and details may be made therein without departing from the spirit and scope of the present disclosure as defined by the appended claims.

What is claimed is:

1. A method for operating an electronic device, the method comprising:
   activating a first camera and a second camera;
   receiving a first image that is output from the activated first camera and a second image that is output from the activated second camera;
   displaying the first image on a first part of an image output area of the electronic device;
   sensing a camera switch request;
   in response to the camera switch request, displaying a dummy image that includes a portion of the first image and a portion of the second image; and
   displaying the second image on a second part of the image output area after displaying the dummy image.

2. The method of claim 1, wherein activating the first camera and the second camera further comprises generating a camera instance that is an object for activating a camera, for each of the first and the second camera.

3. The method of claim 2, wherein activating the first camera and the second camera further comprises setting a camera attribute for each of the first camera and the second camera in accordance with the camera instance.

4. The method of claim 2, further comprising:
   maintaining the camera instance for each of the first camera and the second camera while displaying the at least one of the first image and the second image.

5. The method of claim 1, further comprising:
   mapping each of the received first image and second image to a view.

6. The method of claim 5, further comprising:
   switching the view, after sensing the camera switch request and before displaying the second image.

7. The method of claim 1, wherein a time at which the dummy image is displayed is determined based on whether the first image and the second image are received together.

8. The method of claim 1, wherein at least one of the first image and the second image includes a preview image.

9. The method of claim 1, further comprising:
   receiving the second image, after sensing the camera switch request and before displaying the second image.

10. An electronic device comprising:
    a plurality of cameras, wherein the plurality of cameras comprises a first camera and a second camera; and
    at least one processor configured to:
    activate the first camera and the second camera,
    receive a first image that is output from the activated first camera and a second image that is output from the activated second camera,
    display the first image on a first part of an image output area of the electronic device,
    sense a camera switch request,
    in response to the camera switch request, display a dummy image that includes a portion of the first image and a portion of the second image, and
    display the second image on a second part of the image output area after displaying the dummy image.

11. The electronic device of claim 10, wherein the at least one processor is further configured to generate a camera instance that is an object for activating a camera, for each of the first and the second camera.

12. The electronic device of claim 11, wherein the at least one processor is further configured to set a camera attribute for each of the first camera and the second camera in accordance with the camera instance.

13. The electronic device of claim 11, wherein the at least one processor is further configured to maintain the camera instance for each of the first camera and the second camera while displaying the at least one of the first image and the second image.

14. The electronic device of claim 10, wherein the at least one processor is further configured to map each of the received first image and second image to a view.

15. The electronic device of claim 14, wherein the at least one processor is further configured to switch the view, after sensing the camera switch request and before displaying the second image.

16. The electronic device of claim 10, wherein the at least one processor is further configured to receive the second image, after sensing the camera switch request and before displaying the second image.

17. The electronic device of claim 10, wherein a time at which the dummy image is displayed is determined based on whether the first image and the second image are received together.

18. The electronic device of claim 10, wherein at least one of the first image and the second image includes a preview image.

* * * * *